US009524461B1

(12) United States Patent
Huynh

(10) Patent No.: US 9,524,461 B1
(45) Date of Patent: Dec. 20, 2016

(54) CONCEPTUAL COMPUTATION SYSTEM USING A HIERARCHICAL NETWORK OF MODULES

(71) Applicant: Steven T. Huynh, Fremont, CA (US)

(72) Inventor: Steven T. Huynh, Fremont, CA (US)

( * ) Notice: Subject to any disclaimer, the term of this patent is extended or adjusted under 35 U.S.C. 154(b) by 301 days.

(21) Appl. No.: 14/501,082

(22) Filed: Sep. 30, 2014

(51) Int. Cl.
| | |
|---|---|
| G06E 1/00 | (2006.01) |
| G06E 3/00 | (2006.01) |
| G06F 15/18 | (2006.01) |
| G06G 7/00 | (2006.01) |
| G06N 3/00 | (2006.01) |
| G06N 3/04 | (2006.01) |

(52) U.S. Cl.
CPC ........................................ G06N 3/04 (2013.01)

(58) Field of Classification Search
None
See application file for complete search history.

(56) References Cited

U.S. PATENT DOCUMENTS

| | | | | |
|---|---|---|---|---|
| 5,414,865 A | * | 5/1995 | Beran ................... | G06N 99/005 706/14 |
| 2010/0185567 A1 | * | 7/2010 | Niemasik ............. | G06N 99/005 706/12 |

OTHER PUBLICATIONS

Mountcastle, V. B., "The columnar organization of the neocortex," Brain, 120:701-722 (1997) (22 pages).
O'Reilly et al., "Computational Cognitive Neuroscience," Wiki Book (2012), downloaded from https://grey.colorado.edu/mediawiki/sites/CompCogNeuro/images/8/89/ccnbook_01_09_2012.pdf (167 pages).
Mumford, D., "On the computational architecture of the neocortex II: The role of cortico-cortical loops," Biological Cybernetics, 66:241-251 (1992) (11 pages).
Hopfield, J. J., "Neural networks and physical systems with emergent collective computational abilities," Proceedings of the National Academy of Sciences of the USA, 79:2554-2558 (1982) (5 pages).
Quiroga, R. Q., "Gnostic cells in the 21st century," Acta Neurobiologiae Experimentalis, 73:463-471 (2013) (9 pages).
Seung, H. S., "Pattern analysis and synthesis in attractor neural networks," Lucent Technologies (1997) (8 pages).
Hawkins, J., et al., "Hierarchical Temporal Memory including HTM cortical learning algorithms," V0.2.1, Numenta, Inc. (2011) (68 pages).

(Continued)

*Primary Examiner* — Luis Sitiriche
(74) *Attorney, Agent, or Firm* — Imperium Patent Works; Darien K. Wallace

(57) ABSTRACT

A cognitive architecture uses hierarchically arranged modules to associate the computation of many expected attributes with a single concept. A first value stored in a first module represents a concept state. A second value stored in the first module represents an expectation state. The first module receives a third value that represents an input state. The first module has a lower hierarchy than a second module and a higher hierarchy than a third module. The first module provides the first value to the second module and the second value to the third module. The first value is computed using the third value and concept information stored in the first module. The second value is computed using the first value, the third value and expectation information stored in the first module. An actuated mechanism receives a signal derived from the second value, which influences an operation of the actuated mechanism.

27 Claims, 13 Drawing Sheets

(56) References Cited

OTHER PUBLICATIONS

Hinton et al., "A fast learning algorithm for deep belief nets," Neural Computation, 18:1527-1554 (2006) (16 pages).
Anselmi et al., "Unsupervised learning of invariant representations with low sample complexity: the magic of sensory cortex or a new framework for machine learning?", Center for Brains, Minds and Machines, Memo No. 001 (2014) (23 pages).

* cited by examiner

CONCEPTUAL COMPUTATION SYSTEM USING A HIERARCHICAL NETWORK OF MODULES

TECHNICAL FIELD

The present disclosure relates generally to artificial intelligence, and more particularly to a system that computationally emulates human cognition.

BACKGROUND INFORMATION

Works in the field of neuroscience show that the human cortex is likely made up of columnar modules with reciprocal ascending and descending computational pathways. The human cortex contains about 30 billion neurons organized into hypercolumns, with each hypercolumn including about 100 to 1,000 minicolumns with diameters of 500 μm to 1 mm. Each minicolumn includes about 80 to 100 pyramidal neurons with diameters of 30 μm to 50 μm. It has been proposed that the columnar modules possess a computational architecture that performs the following functions: computes an abstraction from input data received from lower modules; projects a reconstruction from the module's deep neurons to the lower modules that best fits the input data from the lower modules; and projects from the module's superficial neurons to higher modules residual information that lies between the module's abstraction and a higher reconstruction of the module's concept received from the higher modules. It has also been theorized that concepts are memorized in attractor networks in assemblies of "all-or-none" sparsely activated neurons.

Multiple cognitive architectures have been proposed that computationally emulate pattern recognition. Existing cognitive architectures do not, however, emulate human cognition using concept states with correlated dimensions and conceptually constrained expectation states generated from correlations among dimensions of input states. Instead, existing architectures perform pattern recognition to distinguish and label learned patterns or to predict temporal patterns. Several existing architectures are based on neural networks that perform model-free computation based on unsupervised learning. The Hierarchical Temporal Memory (HTM) architecture proposed by Numenta of California, USA, includes a neural network that learns and predicts sparsely distributed patterns based on hierarchical regions. Each hierarchical region includes an array of columns of cells (emulating layer 3 neurons) that perform spatial and temporal prediction of the input in the ascending direction. The so-called "deep learning architecture" includes a deep hierarchy that is used for ascending pattern recognition. The deep hierarchy has many hidden layers, including an associative memory at the top. The HMAX algorithm uses a network of alternating layers of simple cells that perform weighted sum computation and complex cells that perform soft-max computation for ascending pattern recognition. Other cognitive architectures rely on symbolic processing that emulates higher-level cognition, but are limited by manual modeling and programming of computational rules. A cognitive architecture is sought that does not rely on existing pattern recognition architectures and that does not require programming of rules, manual modeling or semantic labeling of learned concepts but yet that can perform unsupervised learning and imprinting of conceptualized expectation knowledge.

SUMMARY

A conceptual computation system includes a hierarchical network of modules. Each module has a concept memory and an expectation memory in which each module projects a concept state to and receives higher expectation states from selected higher modules. Each module projects an expectation state to and receives lower concept states from selected lower modules. Each module uses the concept memory for a first computation of the concept state that is invariant to a range of variation in the received lower concept states. Each module uses the expectation memory for a second computation of the expectation state such that the second computation is based on correlations among dimensions of the received lower concept states. The second computation is modulated by the concept state, and the expectation state varies over the range of variation.

The system has a cognitive architecture that employs hierarchical conceptualized expectation (HCE) to embed expectation computations into concepts and thereby to associate the computation of a large collection of expected attributes with a single concept. The architecture includes modules arranged in a hierarchical network. A first value is stored in a first array of bits in a first module and represents a concept state. A second value is stored in a second array of bits in the first module and represents an expectation state. The arrays of bits are formed by registers. The first module receives a third value that represents an input state. A second module has a higher hierarchy than the first module, and a third module has a lower hierarchy than the first module. The second module receives the first value from the first module, and the third module receives the second value from the first module. The first module derives the third value partly from the third module. The first value is computed using the third value and concept information stored in a concept memory in the first module. The second value is computed using the first value, the third value and expectation information stored in an expectation memory in the first module. An actuated mechanism receives a signal derived from the second value, and an operation of the actuated mechanism is influenced by the signal. For example, the actuated mechanism is an electric motor, and the operation is the movement of the motor's rotor arm.

A method of hierarchical computation and learning can be used to control an actuated mechanism, such as a loudspeaker, an electric motor, or a digital display. The method uses modules in a hierarchical network. A first module has a lower hierarchy than a second module and a higher hierarchy than a third module. The method involves computing a first value using concept information stored in a concept memory, and computing a second value using expectation information stored in an expectation memory. The first module includes both the concept memory and the expectation memory. The first module also includes a first array of bits and a second array of bits. The first value is stored in the first array of bits and represents a concept state. The first value is transmitted from the first module to the second module. The second value is transmitted from the first module to a third module. The second value is stored in the second array of bits and represents an expectation state. The first module receives a third value that is derived partly from the third module and represents an input state. The third value is also used to compute the first value. The second value is computed using the first value and the third value. A signal that is derived from the second value is transmitted to an actuated mechanism, and an operation of the actuated mechanism is controlled based on the signal. For example, the actuated mechanism is a loudspeaker, and the operation is vibrating the diaphragm of the loudspeaker to generate synthesized speech.

Other structures and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
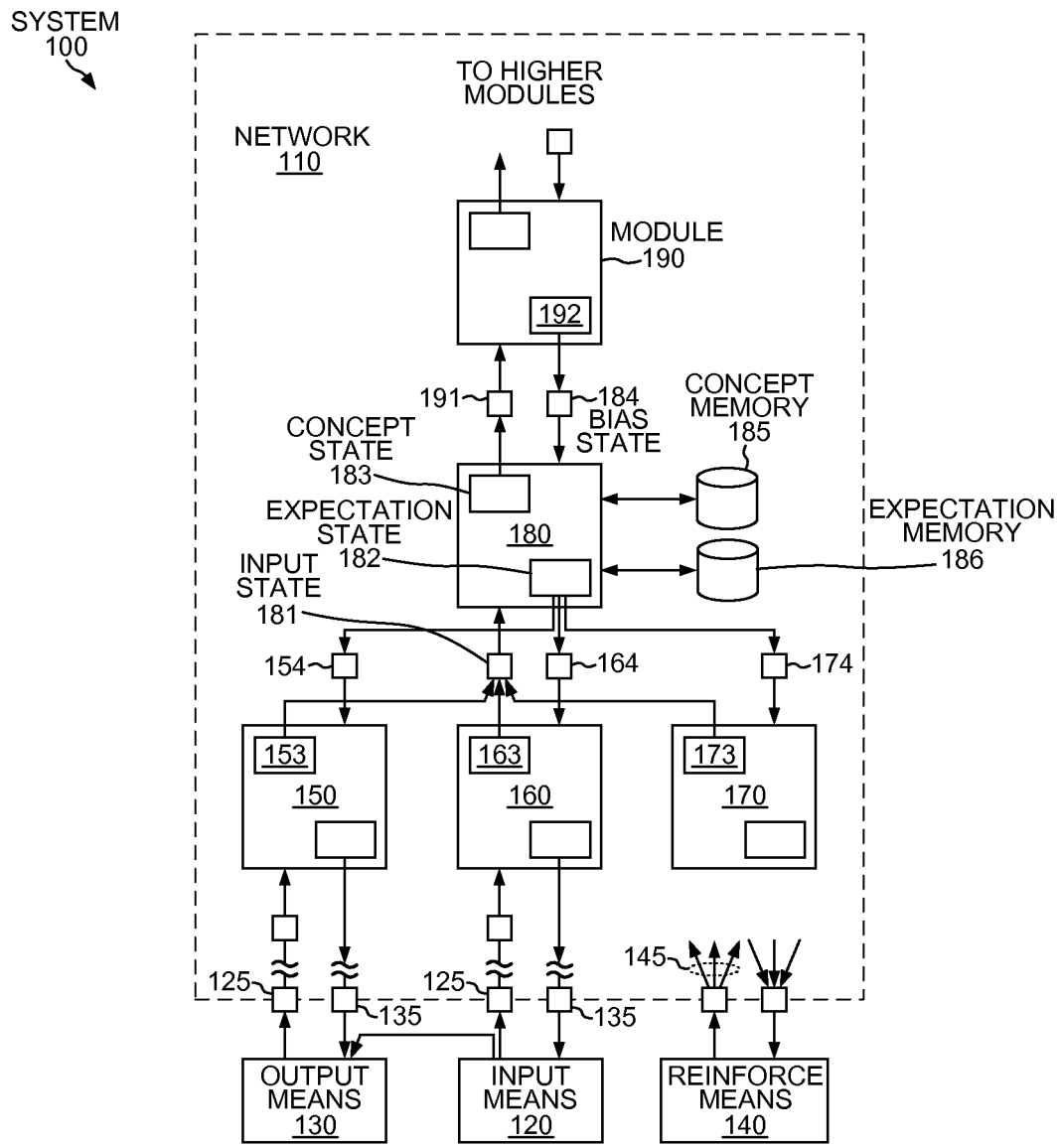
FIG. 1 is a block diagram of a hierarchical conceptualized expectation (HCE) system.

Both scalable model-free cognitive learning as well as higher-level cognitive computation are performed by the hierarchical conceptualized expectation ("HCE") architecture described herein. A concept is represented in the HCE architecture as an emergent cognitive representation that is grounded in a concept manifold of input states that are collectively and invariantly identified with the concept. A concept is therefore an invariant transformation of the concept manifold and constrains expectations on an input state through a constraint associated with the concept manifold (the "conceptual constraint"). A concept can be modeled as a multidimensional set of correlated attributes. The correlation among the attribute dimensions stabilizes the concept and allows the concept to be canalized as a self-organized invariant in hierarchical learning and computation. For each attribute dimension in the concept there is a memory-mediated expectation regarding how the input dimensions correlate to each other.

Expectation computations are embedded into concepts, thus allowing the concepts to be used in goal-driven control and higher planning. The embedding employed by the HCE architecture associates the computation of a large collection of expected attributes with a single concept so as to allow the system to learn, predict, analyze, and decide. The embedding of expectation computations into individual concepts is distinguished from merely recognizing a large number of learned patterns that are associated with a concept. Thus, the HCE architecture does not merely search a database for data based on a key. Rather, the HCE architecture computes an expectation using an expectation memory modulated by a concept. The HCE architecture generates concept states that have correlated dimensions. For example, a concept state is represented by a value in which each bit corresponds to an attribute of the concept (e.g., concept [010101]=plate_no+cup_yes+spoon_no+container_yes+full_no+empty_yes).

Hierarchical computations are performed on the values that represent the concepts. The computations are performed by modules that each include two memories of recorded information: a concept memory and an expectation memory. A value representing an expectation state is computed from correlations among the dimensions of the input state and the concept dimensions.

The HCE architecture includes a method that uses each attribute dimension of the concept to enable a subset of imprinted correlation criteria for a computation of an expectation on the input. The expectation on the input state is thus computed with only imprinted correlation criteria that are relevant to the concept and ignores imprinted correlation criteria that are not relevant to the concept. The concept manifold within the method corresponds to the set of input states that meet the correlation criteria enabled by the concept. The conceptual constraint corresponds to enabling the correlation criteria that are relevant to the concept and to ignoring the correlation criteria that are irrelevant to the concept during both computation and learning.

The HCE architecture also includes a model for emulating neural assemblies in conceptual computation. Each neural assembly within the model corresponds to a module. Each neural assembly includes a deep layer of concept neurons with synapses for an attractor concept memory and a superficial layer of correlation neurons with synapses for an expectation memory. The activation states of the concept neurons together form a concept state. Each activated concept neuron enables a minicolumn of correlation neurons for correlation criteria learning and computation from input dimensions. Each correlation neuron corresponds to a correlation criterion dimension. The activation states of the correlation neurons together form the conceptually constrained correlation state of the input dimensions. The concept neurons project a concept state to higher modules in the hierarchical network, while the correlation neurons dimensionally reduce and project an expectation state to lower modules in the hierarchical network.

Each module of the hierarchical network has a concept memory and an expectation memory imprinted or memorized in some information storing medium ("imprinted memory"). Each module is capable of performing memory-based cognitive computation based on emergent concepts and their constrained expectations. In the hierarchical network, concepts are represented in multivariate concept states with correlated attribute dimensions. Expectations are represented in the hierarchical network by expectation states based on conceptually constrained correlation mapping from the input states. The modules perform computations to decide their concept states from received lower concept states subject to biasing from higher expectation states. The same modules perform computations to map their expectation states from received lower concept states subject to constraining by their concept states. The concept states constrain their expectation mapping to only those input correlation criteria that are relevant to the respective concept states.

The imprinted memories in the modules mediate attractor recurrent couplings between the expectation states and their reciprocal lower concept and between the concept states and their reciprocal higher expectation states. These attractor recurrent couplings compel the network state towards attractor bindings having the lowest energy in which the concept states are sustained by their reciprocal expectation states. During learning, these attractor recurrent couplings enable self-organization of conceptual attractor mappings to align with information received and processed by the hierarchical network.

The term "concept" is used herein to refer generally to, but is not limited to, information that can represent abstractions, actions, beliefs, categories, conceptions, contexts, decisions, events, goals, ideas, intentions, knowledge, notions, observations, perceptions, or situations. The term "expectation" is used herein to refer generally to, but is not limited to, information that can represent anticipations, assumptions, estimations, expectancy, predictions, presumptions, or suppositions. The term "state" refers to any information representational state with multiple attribute dimensions. A state can be encoded in and interconverted between any format and size, including but not limited to a vector, a number, a sparse distributed representation, a key-value list, an attribute set, a symbol from a library of symbols, or an encryption. The term "module" refers to any modular unit, network node, construct, or designation, including, but not limited to, a software structure, an algorithm, a computation step, a pointer, a memory, a resource locator, a physical circuit, a circuit component, a device, a network node, or any combination thereof. Different modules in a network may be implemented differently, and states can be interconverted among formats for communication among modules. The term "constrain" refers to, but is not limited to, a restriction, a selection, a lowering of degrees of freedom, a limiting in scope, a restricting, an affecting, or a compelling.

FIG. 1 is a block diagram of a hierarchical conceptualized expectation (HCE) system 100 implemented in hardware, in software, or in a combination thereof. The system 100 includes a network 110 of modules 150, 160, 170, 180 and 190 that perform cognitive computation based on imprinted conceptualized expectations. The network 110 has a hierarchy in which the module 180 is higher in the hierarchy than the modules 150, 160, and 170, but is lower in the hierarchy than the module 190. The network 110 is coupled to an input means 120, an output means 130, and a reinforcement means 140. The input means 120 includes cameras, microphones, tactile sensors, position sensors, and environmental sensors. The output means 130 includes motors, actuators, speakers, and displays. The reinforcement means 140 generates reinforcement signals 145 based on selected information from the input means 120 and from the network 110. The network 110 receives network input states 125 from the input means 120, projects network output states 135 to the output means 130, and receives the reinforcement signals 145 from the reinforcement means 140.

The module 180 has a concept state 183 and an expectation state 182. Both the concept state 183 and the expectation state 182 are multivariate representations with multiple attribute dimensions. Each concept state and expectation state is represented by a value stored in an array of bits. Each value can be a multidimensional vector comprised of discrete numbers. For example, a concept state can be represented as [0100101 . . . ] or also as [0, 0.9, 0.1, 0.43, 0.85, . . . ]. The array of bits can be formed by registers in any volatile memory location accessible by the processor, such as cache memory or RAM memory.

The system 100 has a concept memory 185 and an expectation memory 186 associated with the module 180. The concept memory 185 and the expectation memory 186 may include auto-associative memory. The concept state 183 has a correlation among its dimensions. An input state 181 is provided to the module 180 from lower modules 150, 160 and 170. The input state 181 has more dimensions than the concept state 183. The module 180 is coupled to provide the expectation state 182 to lower modules 150, 160 and 170 as bias states 154, 164, and 174. The input state 181 includes a combination of the lower concept states 153, 163, and 173. This results in recurrent couplings between the expectation state 182 and each of the lower concept states 153, 163, and 173 that attract each other towards an attractor binding with a lowest energy as mediated by the imprinted memory in the modules 150, 160, 170, and 180. The lower concept state 153 corresponds to an action state that affects an operation of the output means 130. The lower concept state 163 corresponds to a stimulus state that is sensitive to information from the input means 120. The lower concept state 173 corresponds to a context state that modulates the learned mappings between the stimulus state and the action state. The module 180 thus learns and computes a policy mapping among the action, the stimulus, and the context concept states 153, 163, and 173 in its expectation state 182 that is bound to its concept state 183. The expectation state 182 represents a binding relationship among the concept state 183 and the lower concept states 153, 163, and 173. The module 180 is coupled to provide the concept state 183 to, and to receive a bias state 184 from, higher module 190. The bias state 184 comes from a higher expectation state 192. This results in a recurrent coupling between the expectation state 192 and the concept state 183 that attracts each other towards an attractor binding with a lowest energy as mediated by the imprinted memory in the modules 180 and 190.

The system 100 computes the concept state 183 from the input state 181 and bias state 184 with the concept memory 185. The resulting concept state 183 is typically an auto-associative pattern from a set of concept patterns encoded in the concept memory 185 and is invariant for a range of variation in the input state 181. System 100 generates the expectation state 182 from the input state 181 with the expectation memory 186 using an expectation mapping encoded in the expectation memory 186. The generating of the expectation state 182 is based on correlations among the dimensions of the input state 181. The generating of the expectation state 182 is modulated by the concept state 183 through a predefined constraining relationship. The expectation state 182 varies for the range of variation in the input state 181. During learning, the module 180 learns and updates the concept memory 185 and the expectation memory 186 based on the statistics of the input state 181 and the bias state 184. The rate of learning and updating in the module 180 can optionally be modulated by one of the reinforcement error signals 145 in reinforcement learning.

System 100 uses the concept state 183 and the expectation state 182 as information currency for symbolic computation. The concept state 183 is both an informational representation of as well as a constraining factor over the binding between the lower concept states 153, 163, and 173. For the bottom modules of the network 110, input states are received as the network input states 125. Expectation states from the bottom modules of the network 110 are projected as the network output states 135. The output means 130 is controlled based in part on the expectation state 182 projected down the network hierarchy through the lower module 150.

In system 100, the concept state 183 has at least ten dimensions. The concept memory 185 includes a matrix that correlates the dimensions of the concept state 183 to each other. The expectation memory 186 includes matrices that map the input state 181 to the expectation state 182 such that the mapping is constrained by the concept state 183. The expectation state 182 is generated by mapping the input state 181 to a correlation state that is constrained by the concept state 183 and by dimensionally reducing the correlation state to the expectation state 182. The input state 181 is a combination of lower concept states from lower modules in the network that are lower in the hierarchy than the first module. The expectation state 182 is used to represent a binding between the input state 181 and the concept state 183. The expectation state 182 is provided to a selected module among the lower modules, thereby compelling the selected module to reach a lower concept state that correlates with the expectation state 182. The concept state 183 is updated based on a second expectation state from the second module. The expectation memory 186 is updated during learning with reinforcement learning. The expectation state 182 may be provided to a motor means, thereby compelling the motor means to reach a motor state that correlates with the expectation state 182. The motor state is part of the input state 181. System 100 may include a sensor means that provides a sensor state as part of the input state 181, and may further include a motor means that receives the expectation state 182 that compels the motor means to reach a motor state that correlates with the sensor state. The input state 181 has a combination of stimulus dimensions, action dimensions, and context dimensions. The concept state 183 represents a policy mapping among the stimulus, action, and context dimensions. The expectation state 182 is maintained based on a learned criterion among the dimensions of the expectation state 182 and information from modules lower in the hierarchy than the first module. The selected module is selected based on a learned criterion among the dimensions of the expectation state 182 and information from modules lower in the hierarchy than the selected module. A dimension of the concept state 183 is associated with a subset of the expectation memory.

In the module 180, the concept memory 185 and the expectation memory 186 are updated based on both correlation learning and reinforcement learning from input state 181 and bias state 184. Correlation learning modulates the imprinted memory weight values based on co-activation, emulating the Hebbian learning mechanism of neurons. Imprinted memory in a module includes weight values for different co-activation statistics. Each weight value increases for each corresponding above-average co-activation, and decreases for each below-average co-activation. Reinforcement learning speeds up the rate of learning based on a positive reinforcement error signal 145 from the reinforcement means 140, emulating the dopamine-mediated learning mechanism in the human mind.

Figure 2:
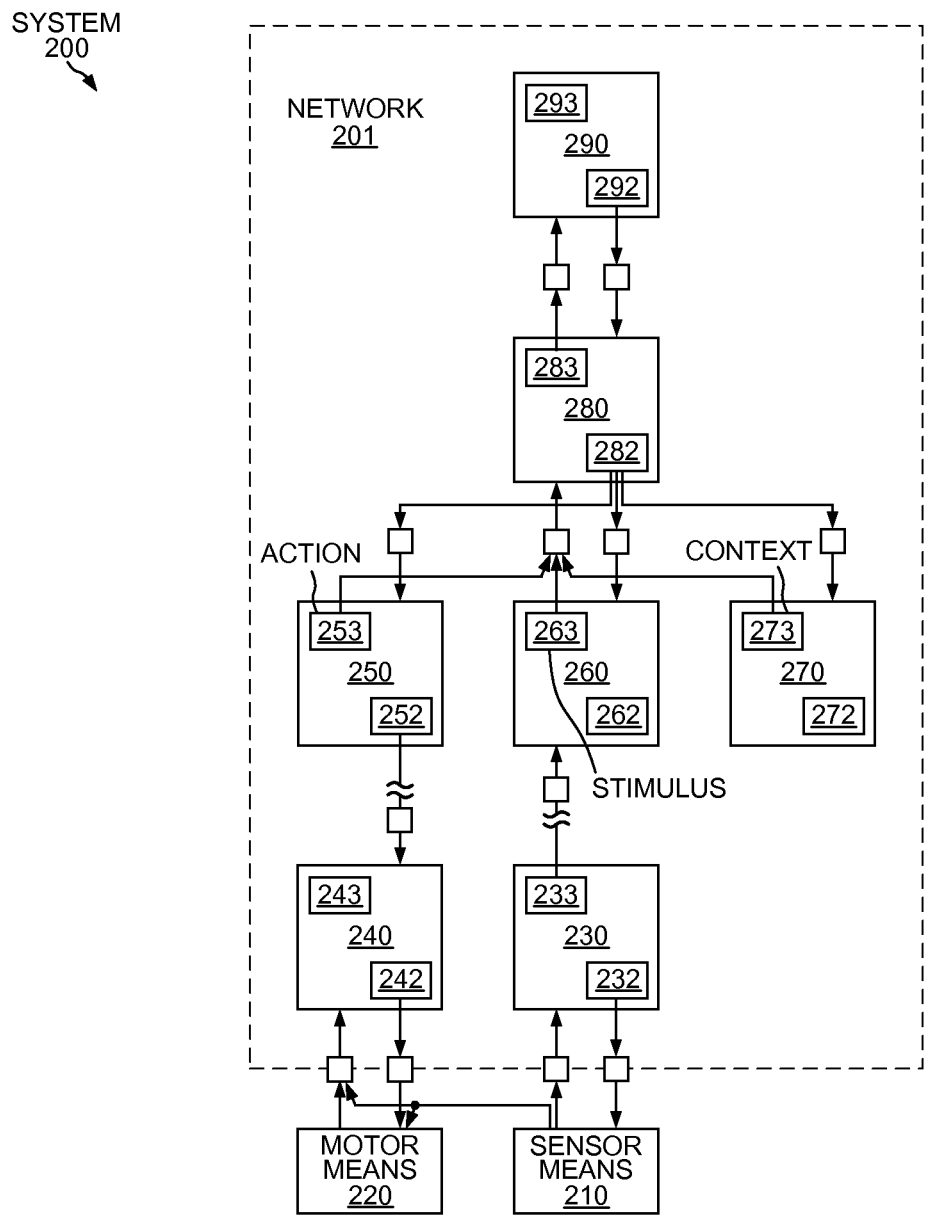
FIG. 2 is a block diagram of another hierarchical conceptualized expectation (HCE) system.

FIG. 2 is a block diagram of another hierarchical conceptualized expectation (HCE) system 200. System 200 comprises a network 201 having modules 230, 240, 250, 260, 270, 280, and 290 in a hierarchy. The module 250 has an action state representation in its concept state 253. The module 260 has a stimulus state representation in its concept state 263. The module 270 has a context state representation in its concept state 273. The module 230 receives information from a sensor means 210 and projects its concept state 233 up the hierarchy to affect the module 260. The module 250 projects its expectation state 252 down the hierarchy to affect the module 240, which in turn projects its expectation state 242 to control a motor means 220. The module 270 has imprinted memory for computing context dimensions that are relevant for a policy mapping in the module 280 between the concept states 253, 263, and 273. The lower modules 250, 260, and 270 project their concept states 253, 263, and 273 to the module 280 as its input state. The module 280 reciprocally projects its expectation state 282 to the lower modules 250, 260, and 270 as their bias states. These reciprocal projections form recurrent attractor couplings between the expectation state 282 and each of the lower concept states 253, 263, and 273 so that the states attract each other towards an attractor binding with the lowest energy as mediated by the imprinted memory in the modules. If the combination of lower concept states 253, 263, and 273 is expected by the concept state 283 according to the imprinted memory in the module 280, then the expectation state 282 has activated dimensions that provide a strong positive feedback to the lower concept states 253, 263, and 273 through the imprinted memory of the lower modules 250, 260 and 270. If the concept states 253, 263, or 273 deviate slightly from a combination expected by the concept state 283, then the expectation state 282 provides a positive feedback to compel the concept states 253, 263, and 273 towards an attractor binding with the lowest energy. If the concept states 253, 263, or 273 deviate significantly from those expected by the concept state 283, then the expectation state 282 has few activated dimensions and no longer provides a positive feedback to the concept states 253, 263, and 273.

The module 280 learns and decides its concept state 283 based on lower concept states 253, 263, and 273 and an upper expectation state 292 received from the upper module 290. In the ascending direction, the concept state 283 is computed and learned from the correlations among the dimensions of the action, stimulus, or context concept states 253, 263, and 273. In the descending direction, the concept state 283, once learned and decided, determines a conceptually constrained policy mapping from given action and stimulus concept states 253 and 263 to an expected context concept state 273, from given stimulus and context concept states 263 and 273 to an expected action concept state 253, or from given context and action concept states 273 and 253 to an expected stimulus concept state 263. The conceptually constrained policy mapping results in the expectation state 282, which is computed based on correlations among the dimensions of the concept states 253, 263, and 273. Due to the recurrent attractor coupling, the expectation state 282 compels the lower modules 250, 260, and 270 towards an attractor binding of concept states 253, 263, and 273 against perturbation in any one of these states or from an initial condition. For example, the expectation state 282 computed from given stimulus or context concept state 263 or 273 can compel the module 250 from an initial condition to reach an attractor action concept state 253. The concept state 283 represents a goal state, while the expectation state 282 represents an expectation on lower modules including the module 250, which in turns extends control down the hierarchy to compel the motor means 220 to its mapped motor state until there is a change in the stimulus or context concept state 253 or 273. The expectation state 242 is provided to the motor means 220, thereby compelling the motor means 220 to reach a motor state that correlates with the expectation state 242. The motor state is part of an input state to the module 240. The sensor means 210 provides a sensor state as part of the input state to the module 240, and the motor means 220 may be compelled by the expectation state 242 to reach a motor state that correlates with the sensor state of the sensor means 210.

Figure 3A:
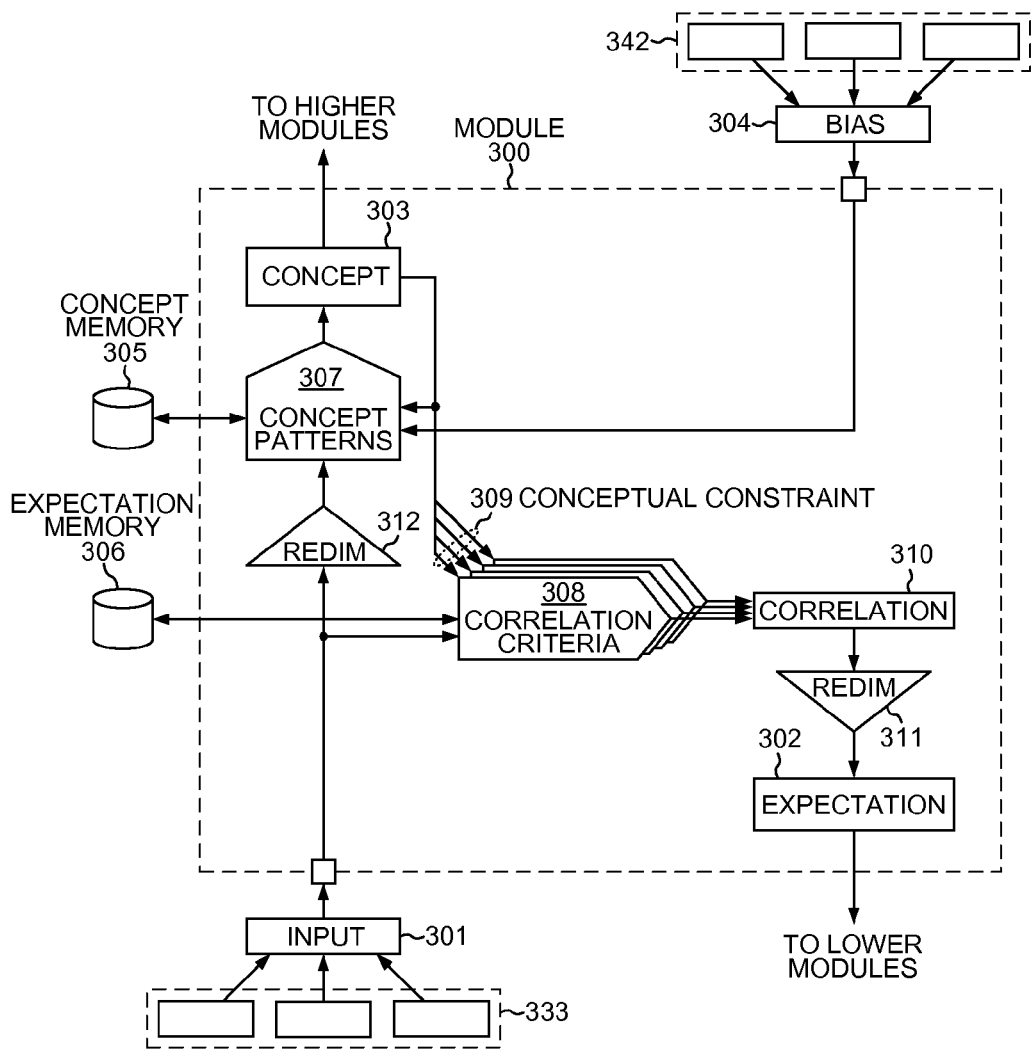
FIG. 3A is a block diagram of an embodiment of a module in HCE systems.

FIG. 3A is a block diagram of an embodiment of a module in an HCE system. A module 300 has a concept state 303 and an expectation state 302. The module 300 receives an input state 301 and a bias state 304. The concept state 303, the expectation state 302, the input state 301, and the bias state 304 are multivariate representations with multiple attribute dimensions. The module 300 has a correlation state 310 that corresponds via an expectation re-dimensioning transform 311 to the expectation state 302. Typically, the concept state 303 has from 10 to 1,000 dimensions, the expectation state 302 has from 10 to 10,000 dimensions, and the correlation state 310 has from 100 to 100,000 dimensions. The concept state 303 and the expectation state 302 may have a Boolean or continuous value in each dimension. Both the concept state 303 and the expectation state 302 have a sparseness level ranging from 3 to 30 percent. In the preferred embodiment, the concept state 303 and expectation state 302 have a value between 0 and 1 for each dimension, whereby a value above a 0.5 threshold means the dimension is activated. The input state 301 comprises a combination of received lower concept states 333 and thus has the combined dimensions of the lower concept states 333. The bias state 304 comprises a combination of received higher expectation states 342 and thus has the combined dimensions of the higher expectation states 342. The number of dimensions for the input state 301 and bias state 304 are expandable to automatically accommodate the number of other modules in the network providing information to the module.

In the module 300, the concept state 303 and expectation state 302 are results of k-winner-take-all (kwta) activation functions, with k being the number of activated dimensions corresponding to the sparseness level. The concept state 303 and expectation state 302 typically follow an organization in which a dimension is near a set of neighboring dimensions and inhibits the set of neighboring dimensions if the dimension is activated. The activated dimensions are sparse, such that each activated dimension corresponds to a multiplicity of inhibited dimensions.

The module 300 is associated with a concept memory 305 and an expectation memory 306. The concept memory 305 encodes a set of concept patterns 307 from which the module is operable to select the concept state 303. The concept state 303 is selected based on the bias state 304 and the input state 301 that are dimensionally reduced by a concept re-dimensioning transform 312. The concept memory 305 is typically a recurrent auto-associative memory, which has been found in studies to have a maximum storage capacity of approximately 0.1C to 3C unique patterns depending on the recurrent connectivity and sparseness, where C is the number of recurrent connections in the auto-associative memory. The module 300 can therefore be imprinted with up to 1,000 potential concept states at a 10% sparseness level if the module is configured with 1,000 dimensions for the concept state 303. The expectation memory 306 encodes correlation criteria 308 through which the module is operable to generate the expectation state 302 subject to a predefined conceptual constraint 309 from the concept state 303.

In the module 300, the concept memory 305 and the expectation memory 306 include sparse matrices associated with the module 300 for matrix computation. The sparse matrices may follow an organization in which matrix elements associating neighboring dimensions have a higher probability of non-zero weighting than do distant dimensions, thus reducing memory and computation. The set of concept patterns 307 are the eigenvectors of a matrix operation associated with the concept memory 305. The correlation criteria 308 include row vectors of a matrix associated with the expectation memory 306. Each row vector encodes a different learned correlation criterion among co-activating dimensions of the input state 301. Each correlation criterion corresponds to a dimension of the correlation state 310. The conceptual constraint 309 is an intrinsic mapping matrix from each dimension of the concept state 303 to a predefined subset of the dimensions of the correlation state 310. The module 300 uses the correlation criteria 308 to compute the correlation state 310 from the input state 301, whereby the computing is subject to the conceptual constraint 309 from the concept state 303. The computing may be by matrix multiplication between the matrix for expectation memory 306 and the input state 301, by comparing with an activation threshold, and by inhibiting the dimensions in the correlation state 310 that do not correspond to any activated dimension of the concept state 303. The correlation state 310 is dimensionally reduced to the expectation state 302 by an expectation re-dimensioning transform 311. In other embodiments, the set of concept patterns 307 may be a list of vectors, and the correlation criteria 308 may be in a table of vectors, an array of mapping parameters, or a set of weighted mapping rules. In other embodiments of the module 300, the correlation criteria 308 may be partially recurrent.

In some embodiments of the module 300, the module 300 may also use the correlation state 310 in the computing of the concept state 303. The module 300 may have a mapping from the expectation state 302 to the concept state 303 to validate the concept state 303. The correlation criteria 308 may have an additional recurrent feedback input from the expectation state 302.

Figure 3B:
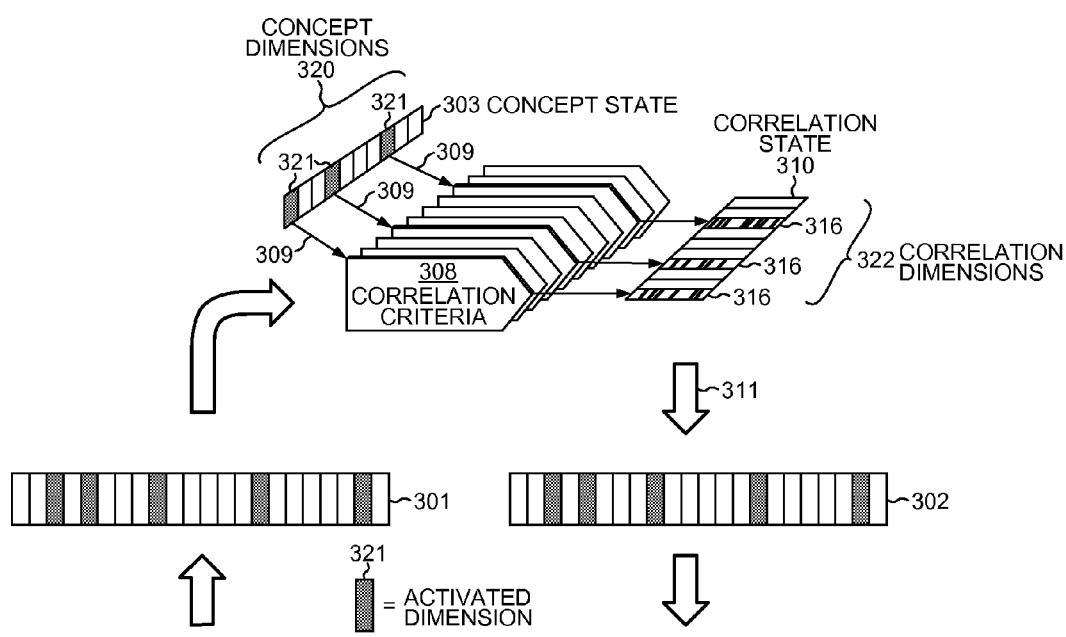
FIG. 3B is a block diagram of an operation of the module shown in FIG. 3A.

FIG. 3B is a block diagram of an operation of the module 300 shown in FIG. 3A. The concept state 303 comprises a set of concept dimensions 320, while the correlation state 310 comprises a set of correlation dimensions 322. The correlation criteria 308 include different learned correlations among the dimensions of the input state 301, and each learned correlation maps to a different dimension of the correlation state 310. Each activated concept dimension 321 in the set of concept dimensions 320 corresponds to a disinhibited subset 316 in the set of correlation dimensions 322. The conceptual constraint 309 involves disinhibiting the dimensions in the disinhibited subset 316 and inhibiting the dimensions not in the disinhibited subset 316 when the concept dimensions 321 are activated. In the preferred embodiment, each dimension of the correlation state 310 has a value of 0 when inhibited. The correlation state 310 may be computed with any form of mapping based on learned relationships among the dimensions of the input state 301, as long as the correlation state 310 is subject to the conceptual constraint 309. The learned relationships may be in any combination of vectors, matrices, transformations, non-linear functions, kernel mappings, and other mathematical operations. The expectation mapping may be partially recurrent, with the correlation state 310 having an auto-association.

Figure 4A:
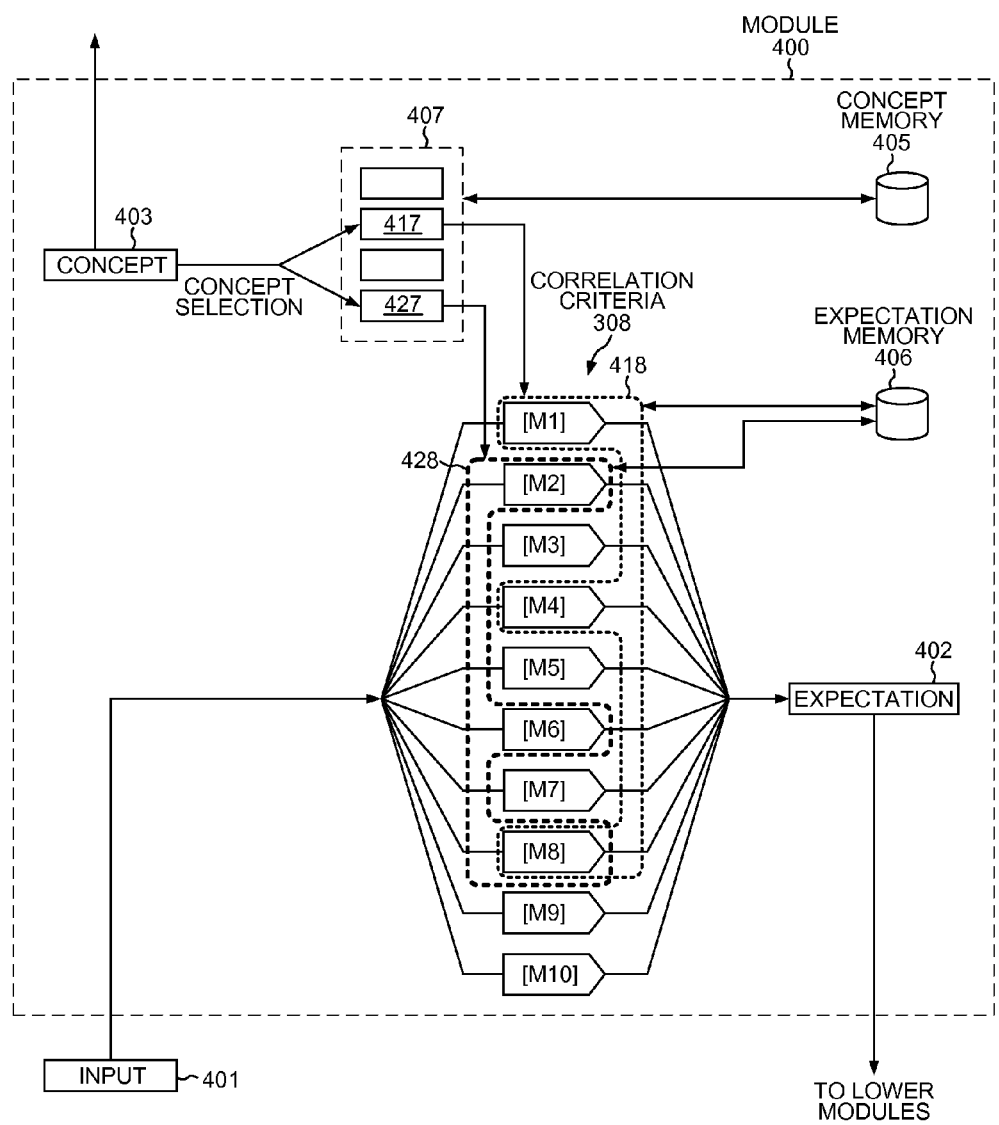
FIG. 4A is a block diagram of another embodiment of a module in HCE systems.

FIG. 4A is a block diagram of another embodiment of a module 400 in a robotic system. The robotic system can utilize general objects, such as a cup or a pitcher. The module 400 has a concept state 403, an expectation state 402, an associated concept memory 405, and an associated expectation memory 406. The module 400 receives an input state 401 of dimensions required for deciding utilization of different objects, including stimulus dimensions for a cup or a pitcher, context dimensions for full or empty, and action dimensions for receiving or pouring liquid. The module 400 is operable to select its concept state 403 between a "cup-utilization" pattern 417 and a "pitcher-utilization" pattern 427 from the set of concept patterns 407 encoded in the concept memory 405. The "cup-utilization" pattern 417 corresponds to a first "cup-utilization" subset 418 of correlation criteria 308 encoded in the expectation memory 406.

The "cup-utilization" subset 418 has learned correlation criteria for utilizing a cup object, such as "cup can receive liquid when empty" and "cup cannot receive liquid when full". The "pitcher-utilization" pattern 427 corresponds to a second "pitcher-utilization" subset 428 of correlation criteria 308 encoded in the expectation memory 406. The "pitcher-utilization" subset 428 has learned correlation criteria for utilizing a pitcher object, such as "pitcher can pour liquid when not empty" and "pitcher cannot pour liquid when empty". The "cup-utilization" subset 418 and the pitcher-utilization subset 428 are learned by the module 400 through reinforcement learning, such that they result in rewarding instead of adverse outcomes when applied. When the concept state 403 has the "cup-utilization" pattern 417, the module 400 determines an expectation state 402 from the input state 401 based on the "cup-utilization" subset 418. When the concept state 403 has the "pitcher-utilization" pattern 427, the module 400 determines the expectation state 402 from the input state 401 based on the "pitcher-utilization" subset 428. The expectation state 402 is provided down the hierarchy to control a robotic arm to use the pitcher to pour liquid into the cup only when the pitcher is not empty and the cup is not full.

Figure 4B:
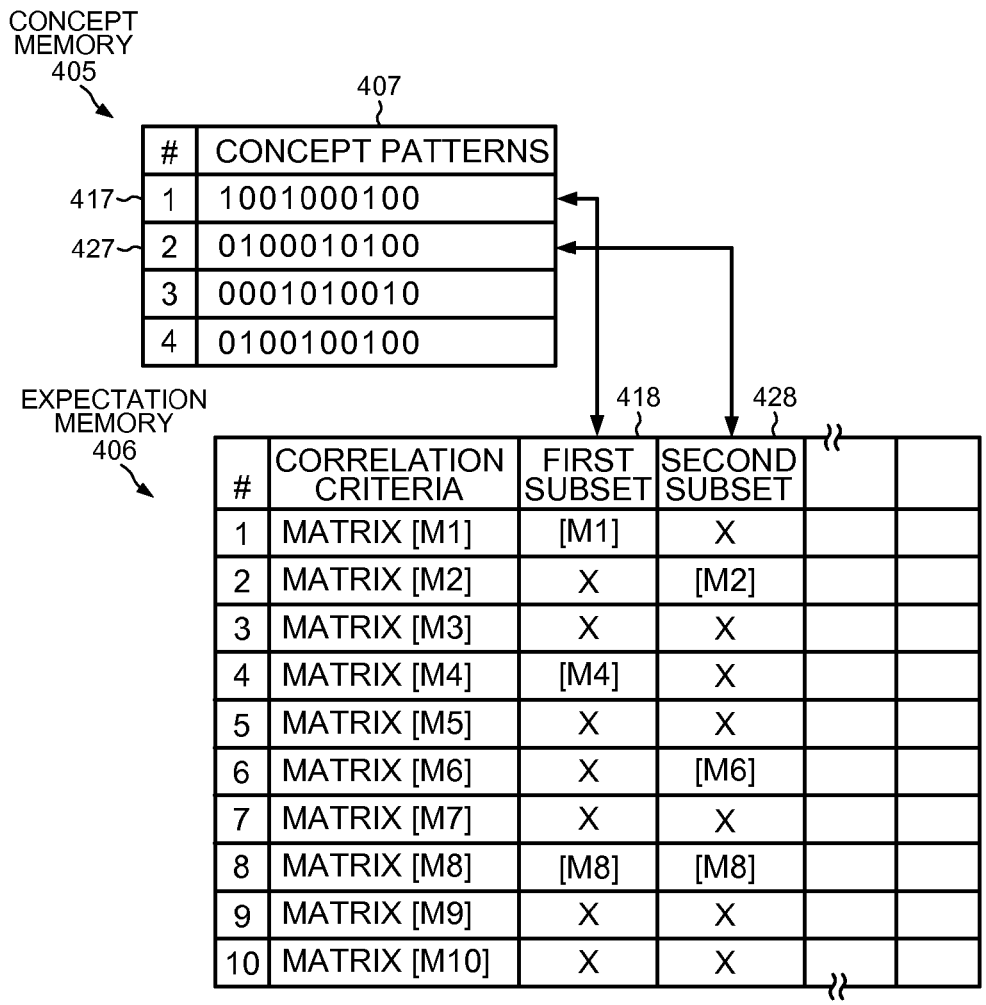
FIG. 4B is a block diagram of an operational example of the module shown in FIG. 4A.

FIG. 4B is a block diagram of an operational example of the module 400 shown in FIG. 4A. In the example, the concept memory 405 and the expectation memory 406 are organized as tables or similar constructs. The table for the concept memory 405 enables the selection of a concept pattern with binary-valued dimensions for the concept state 403 in which the concept pattern represents an imprinted correlation among the dimensions with value of 1. The table for the expectation memory 406 enables the selection of a subset of correlation criteria based on the selected concept pattern. If the "cup-utilization" pattern 417 is selected, then the "cup-utilization" subset 418 is selected. The correlation criteria "cup can receive liquid when empty" and "cup cannot receive liquid when full" in the subset 418 can be represented in matrices [M1] and [M4] in the expectation memory 406. If the "pitcher-utilization" pattern 427 is selected, then the "pitcher-utilization" subset 428 is selected. The correlation criteria "pitcher can pour liquid when not empty" and "pitcher cannot pour liquid when empty" in the subset 428 can be represented in matrices [M2] and [M6] in the expectation memory 406. The correlation criteria can be matrices, neural network connection weights, or nonlinear mappings.

In the module 400, a concept is represented by the concept state 403, and an expectation is represented by the expectation state 402. The concept state 403 typically has 10 to 1,000 dimensions, and has a sparseness level so that only 3 to 30 percent of the dimensions are activated. The expectation state 402 typically has 10 to 10,000 dimensions, and has a sparseness level so that only 3 to 30 percent of the dimensions are activated. Each dimension has a value that may be Boolean or continuous over a range limited by a sigmoid function, such as from 0 to 1. A dimension is activated when its value is higher than an activation threshold, which is typically set at 0.5 for a value range of 0 to 1.

The module 400 models a perception of the input state 401 with the concept state 403, and a comprehension of the input state 401 with the expectation state 402. The module 400 determines a conceptually constrained expectation state 402 from the correlation criteria encoded in the expectation memory. If the input state 401 is expected by the concept state 403 according to the imprinted memory in the module 400, then the expectation state 402 has activated dimensions. If the input state 401 is not expected by the concept state 403, then the expectation state 402 has fewer activated dimensions and a large distance from the expectation state 402 with expected input state 401.

Figure 5A:
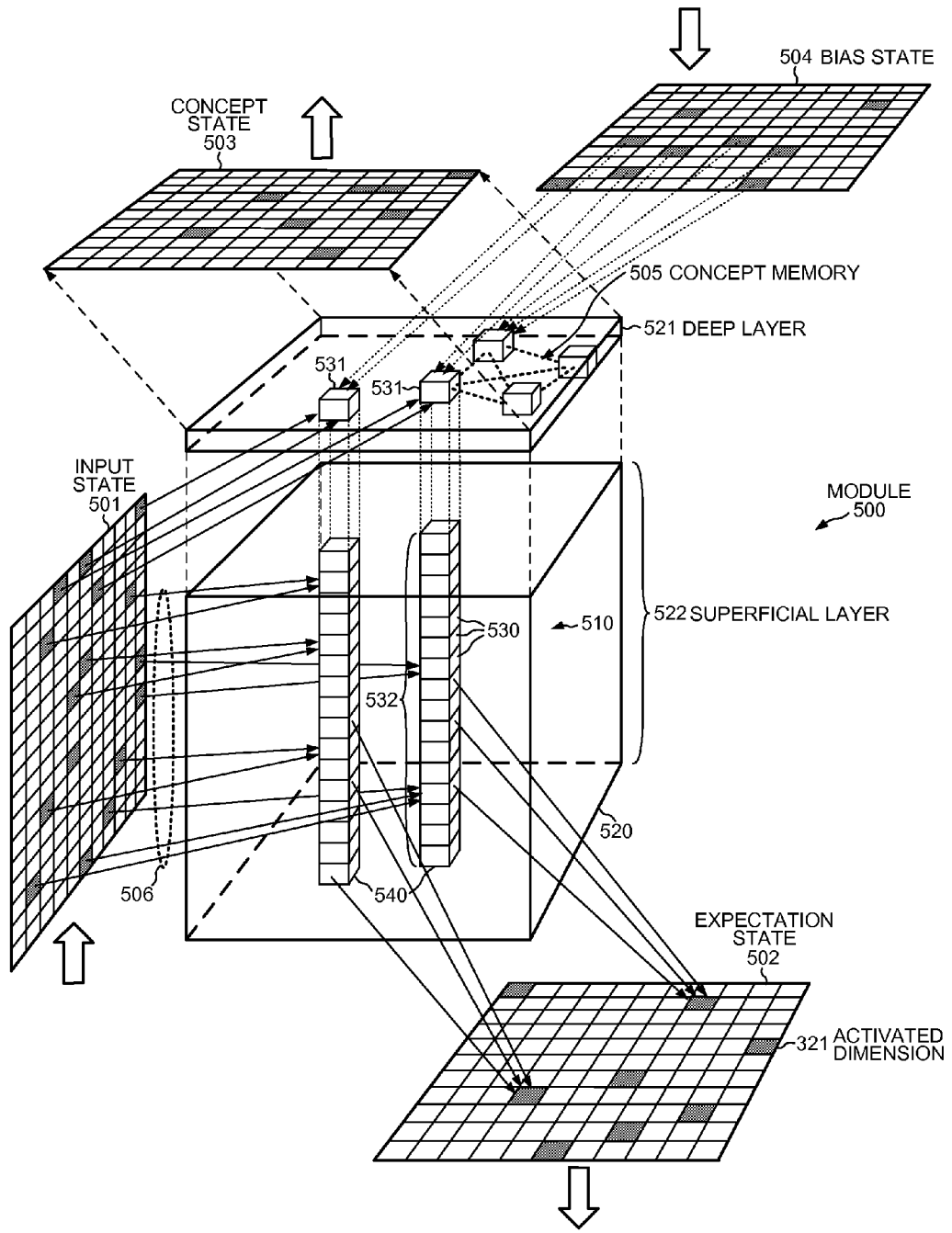
FIG. 5A is a block diagram of an embodiment of a module using artificial neural assemblies.

FIG. 5A is a block diagram of an embodiment of a module 500 using artificial neural assemblies. Module 500 includes an assembly 520 of artificial neurons 530 organized into minicolumns 540. Each of the neurons 530 is a computing unit with an activation value that emulates a neural firing rate. Each minicolumn 540 contains a concept neuron 531 in a deep layer 521 of the assembly 520 and a set of correlation neurons 532 in a superficial layer 522 of the assembly 520. Each concept neuron 531 in the assembly 520 represents an attribute dimension of a concept state 503. Each correlation neuron 532 in the assembly 520 represents a dimension of a correlation state 510. The correlation state is made up of all of the neurons 530 in the cube of superficial layer 522. The weighted connections within the deep layer 521 form an auto-associative concept memory 505 with recurrent weighted connections among the concept neurons 531. Each concept neuron 531 receives weighted projections from a bias state 504. A concept neuron 531 is driven by weighted projections from an input state 501. The weighted connections within the superficial layer 522 and from the input state 501 to the superficial layer 522 form an expectation memory 506. The expectation memory 506 may be partially auto-associative with recurrent weighted connections among correlation neurons 532. The artificial neurons 530 may follow local connectivity rules in which connections to neighboring neurons and minicolumns have higher probabilities of having non-zero weights than do distant connections.

Figure 5B:
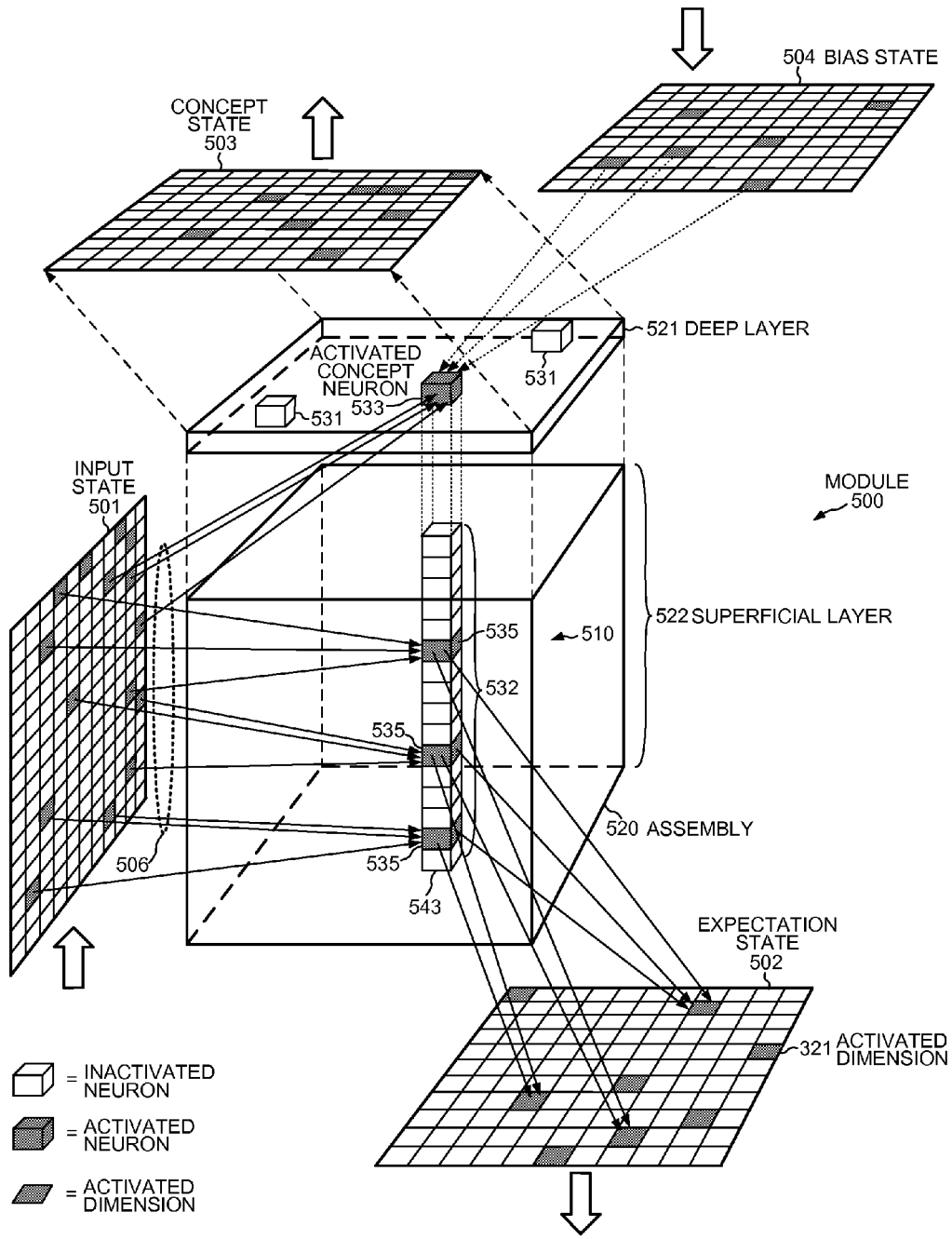
FIG. 5B is a block diagram of the operation of the module shown in FIG. 5A

FIG. 5B is block diagram of an operation of module 500 shown in FIG. 5A. For the concept state 503, if a concept neuron 533 is activated with its activation value above an activation threshold, then its corresponding minicolumn 543 is disinhibited. Correlation neurons 532 in the disinhibited minicolumn 543 can be activated by weighted connections from the input state 501. The activated correlation neurons 535 are projected by weighted connections onto an expectation state 502. The assembly 520 typically has 100 concept neurons, but the number can range from 10 to 1,000 concept neurons. Even though the number of neurons and dimensions for the correlation state 510 is large and can be 20 to 100 times the number of dimensions for the concept state 503, only those neurons that are disinhibited by the concept dimensions need to be updated, thus reducing the required computational resource by a factor of 3 to 30 depending on the sparseness of the concept dimensions.

In some embodiments of the module 500, the module 500 may also have additional mapping connections from the correlation neurons 532 to the concept neurons 531. The module 500 may have mapping connections from the expectation state 502 to the concept neurons 531 to validate the concept state 503. The correlation neurons 532 may receive additional recurrent feedback mapping connections from the expectation state 502.

Figure 6:
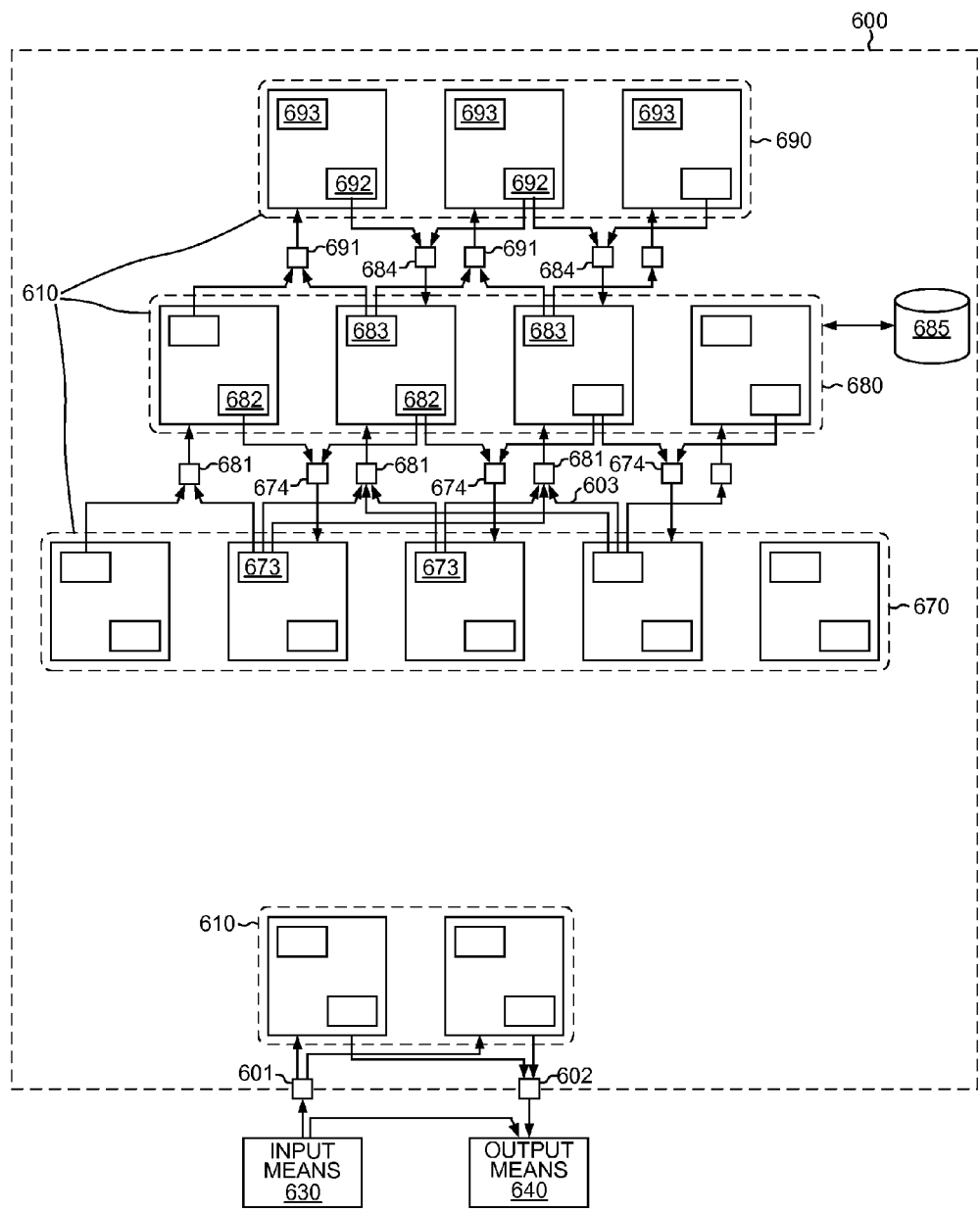
FIG. 6 is a block diagram of a modular network in an HCE system.

FIG. 6 is a block diagram of a modular network 600 in a HCE system. The network 600 comprises network input ports 601, network output ports 602, modules 610, and connections 603. The network 600 may comprise up to 20,000 or more modules. Each module among the modules 610 has a concept memory and an expectation memory. Each module projects a concept state to and receives higher expectation states from selected higher modules. Each module projects an expectation state to and receives lower concept states from selected lower modules. Each module uses the concept memory for a first computation of the concept state that is invariant to a range of variation in the received lower concept states. Each module uses the expectation memory for a second computation of the expectation state for which the second computation is based on correlations among dimensions of the received lower concept states. The second computation is modulated by the concept state, and the expectation state varies within the range of variation. In each module among the modules 610, the concept state has correlated attribute dimensions, the concept memory encodes concept patterns, and the second computation is constrained by the activated attribute dimensions of the concept state.

The modules 610 include modules 680, hierarchically higher modules 690, and hierarchically lower modules 670. The connections 603 couple concept states 673 from the modules 670 to the modules 680 as input states 681, couple concept states 683 from the modules 680 to the modules 690 as input states 691, couple expectation states 692 from the modules 690 to the modules 680 as bias states 684, and couple expectation states 682 from the modules 680 to the modules 670 as bias states 674. These connections 603 result in attractor couplings between the expectation states 682 and each of their reciprocal concept states 673, and between the expectation states 692 and each of their reciprocal concept states 683.

The network 600 includes modules 610 that are interconnected hierarchically in the network. Each level of the network hierarchy can have a multiplicity of modules. The modules 610 hierarchically model the perception of information from the network input ports 601 into concept and conceptualized expectation states. The network 600 can be implemented in any form of software or hardware. In the network 600, typical modules 680 receive input states 681 that combine lower concept states 673 from at least two other lower modules 670, and reciprocate by projecting their expectation states 682 to those lower modules 670. The modules 680 optionally receive reinforcement error signals to modulate their reinforcement learning rates. At the bottom of the network hierarchy, the modules 610 receive input states via the network input ports 601 and project expectation states via the network output ports 602. The received input states may include combined sensor or other input states from sensors or other input means 630. The projected expectation states may be used to control motors or other output means 640.

The network 600 performs cognitive computation in both ascending and descending directions, emulating the hypothesized bidirectional cognitive computation in the human cortex. For ascending perception, the network 600 performs computation using imprinted memory 685 associated with the modules 680 to decide concept states 683 based on received lower concept states 673. For descending control, the network 600 performs computation using the same imprinted memory 685 to constrain expectation states 682 based on received higher expectation states 692. Associating the imprinted memory 685 with the modules 680 allows cognitive computation and learning algorithms to be object-oriented and based on input state change or bias state change. If the lower concept states 673 and higher expectation states 692 to the modules 680 are unchanged, then the modules 680 do not require further computational bandwidth or resource once their concept states 683 and expectation states 682 have reached steady states.

The imprinted memories in the modules mediate attractor couplings between the expectation states 682 and their reciprocal concepts 673, and between the concept states 683 and their reciprocal expectation states 692. These attractor couplings compel the state of the network 600 towards attractor bindings with lowest energy, in which the concept states are sustained by their reciprocal expectation states. During learning, these attractor couplings enable self-organization of attractor-based mappings among hierarchical concepts to align with information received and processed by the hierarchy network.

The network 600 allows the concept states 683 to be meaningfully grounded in the modules 680 with associated expectations on lower concept states 673. The network 600 is part of a powerful and scalable system in which concepts and conceptualized expectations are used as the informational currency for symbolic computation. Low level concepts at the bottom of the network 600 build up to high level concepts at the top, and high level expectations at the top extend control down to low level expectations at the bottom. Dimensionality is systematically reduced at each hierarchy level in the network 600 to avoid the "curse of dimensionality". High-level concepts are more abstract and constrain broader and more complex lower concepts, but are still tokenized as concept states 683 and 693.

The collection of all network concept and expectation states grounded in the modules forms the dynamic network state of the network 600. The network 600, using the imprinted memory in the modules 610, computes a next network state from the current network state in combination with the information from the network input ports 601. The collection of all concept patterns and correlation criteria grounded in the modules forms the imprinted declarative and procedural memory of the network 600. Declarative and procedural memory can be continually imprinted and tuned in all modules, with the higher regions imprinting more multi-modally invariant higher concepts. New concepts and expectations can be formed, reinforced, and pruned in each module in all regions of the network in real time, in parallel to cognitive computation.

Concept formation and learning in the imprinted memory 685 are stabilized by both temporal invariance and descending control. Temporal invariance takes advantage of the high likelihood that lower concept dimensions that are co-activated contiguously in time correspond to the same invariant concept. Furthermore, the contiguous trajectory formed by the input states 681 in temporal proximity traces out the generic and non-generic transformations of the concept states 683 in their concept manifolds. In the modules 680, the concept states 683 remain recurrently stable for slowly varying input states 681, allowing imprinting of correlation criteria that incorporate the trajectory of the varying input states 681 into the concept manifolds of the concept states 683. Over time and repetitions with different trajectories, the temporal invariance mechanism expands the concept manifolds to encompass all experienced transformations of the concept states 683 in the input space. Thus, with the help of temporal invariance, the modules automatically learn and map transformations of the invariant concept states 683 into their concept manifolds, enabling a computational mechanism to discount the transformations of these invariant concept states 683 based on the imprinted memory 685. Descending control provides an additional mechanism for learning correlation criteria for the concept states 683 by actively maintaining the concept states 683 as invariant while the input states 681 are changing. Thus, descending control forces correlation criteria formation and strengthens the imprinted memory 685 by correlation or reinforcement learning. Active maintenance through descending control is an important means for supervised as well as unsupervised learning of correlation criteria and transformations, including correcting any inaccuracy in past learning.

The network 600 is organically scalable in the sense that a new dimension or blank module can be added into the network without causing a computational disruption. A new dimension can be introduced for a state in a module with corresponding zero valued matrix weights so that it does not affect computation. A new module can be added to receive lower concept states from existing modules and to project its initially null concept and expectation states onto existing modules in the network. The existing modules automatically increment the number of inputs to accommodate the new module with initially zero matrix weights for the new dimensions. As the new module learns from the lower concept states, the module becomes imprinted with new concept states and correlation criteria and starts projecting non-null concept and expectation states that the existing modules can begin to incorporate as inputs. The modules 610, 670, 680, and 690 may be implemented with different sizes and embodiments to optimize performance in different regions of the network 600. At the bottom regions of the network hierarchy, the modules 610 need to cover large receptive fields with high resolution from the sensors or other input means. Dedicated modules with large imprinted memory and specialized computational methods may be used in these regions.

Figure 7:
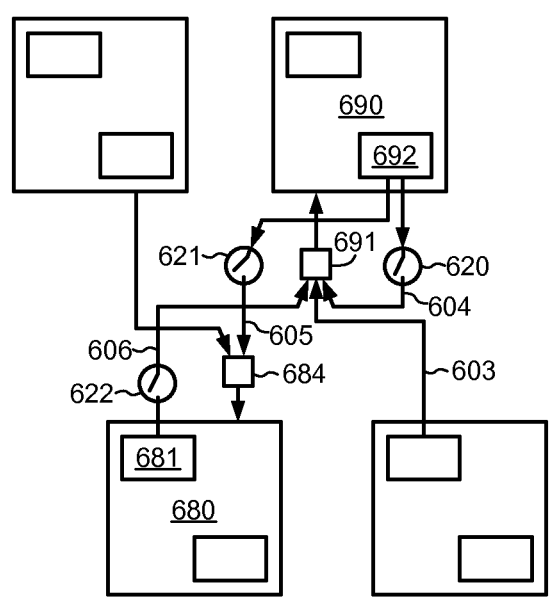
FIG. 7 is a detailed diagram of a portion of the network shown in FIG. 6.

FIG. 7 is a detailed diagram of a portion of the network 600 of FIG. 6. The network 600 also includes gates 620, 621, and 622. The coupling by connections 603 includes optional or partial gating by the gates 620, 621, and 622. The gates 620, 621, 622 receive relevant expectation and concept states and determine whether to enable or disable their respective connections based on learned gating conditions in their imprinted memory. A module 690 is operable to have its expectation state 692 maintained by gate 620 such that the maintaining is via the connection 604 that couples the expectation state 692 recurrently back as part of an input state 691 of the module 690. The module 690 is operable to have its expectation state 692 selected by another gate 621 such that the selecting is via the connection 605 that couples the selected expectation state 692 to a bias state 684 of a module 680. The module 680 is operable to have its concept state 681 selected by another gate 622 in which the selecting is via the connection 606 that couples the selected concept state 681 to the input state 691 of the module 690. In some embodiments, concept states and expectation states go through gates such as 620, 621, and 622 between modules in the providing of concept and expectation states and in the receiving of input and bias states.

Figure 8:
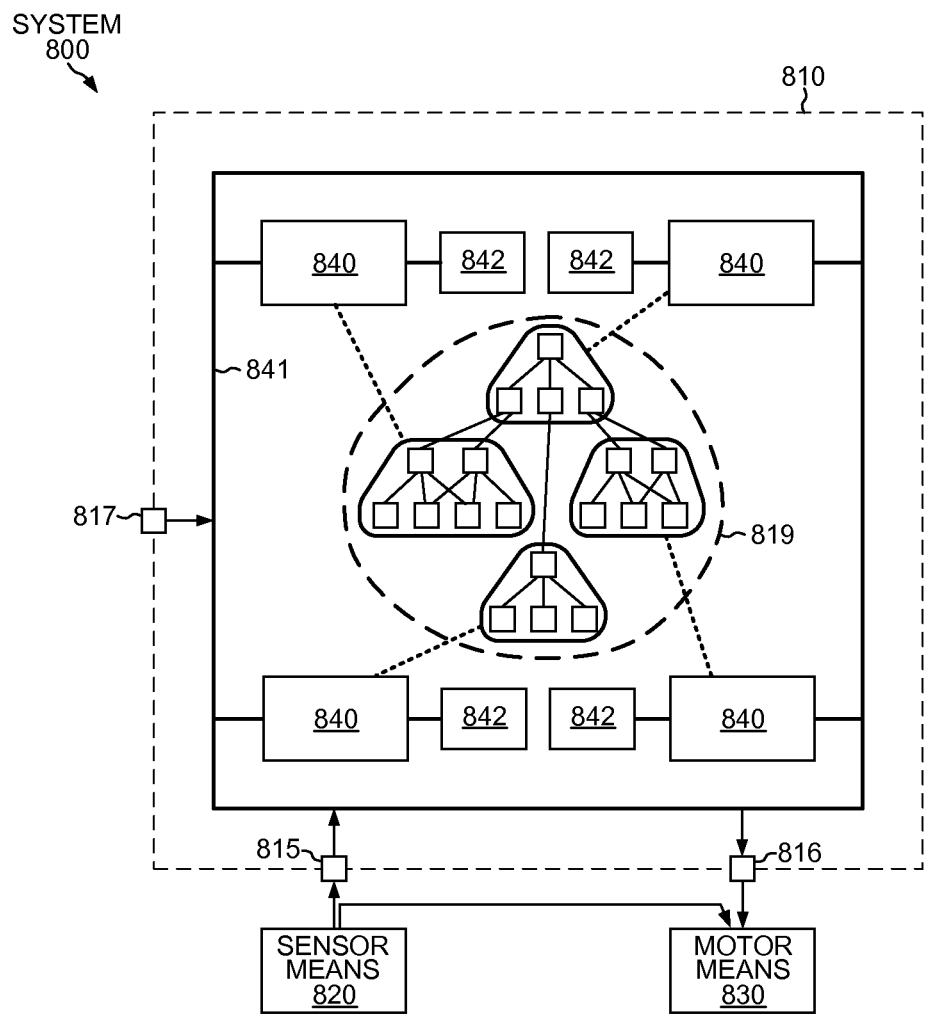
FIG. 8 is a block diagram of a robotic HCE system.

FIG. 8 is a block diagram of a robotic HCE system 800. System 800 includes a hierarchical network 810 of up to 20,000 or more modules and operates in an environment. The network 810 is implemented with processors 840 for which each processor 840 may each have multiple core or processing units. The network 810 has network input ports 815, network output ports 816, and reinforcement ports 817. The network 810 has a network state 819 comprising all concept states and expectation states in the network 810 that hierarchically model the state space of the whole system comprising the system 800 and the environment. The network 810 receives input information from sensor means 820 through network input ports 815. The network 810 provides output information to motor means 830 through the network output ports 816. At each time point, the network 810 receives input information from sensor means 820, updates and recalculates the network state 819, and provides output information to the motor means 830. If the network input state matches learned mappings for the expectation states in the network state 819, the network state 819 is unchanged. If the input information does not match learned mappings for the expectation states, the network state 819 is updated accordingly. With the updated network state 819, the network 810 provides the updated output information to the motor means 830, compelling the motor means 830 in the system 800 to perform activity in connection with the updated network state 819. The activity performed by the system 800 results in a change in the environment relative to the system 800. At subsequent time points, the network 810 again receives input information from sensor means 820, updates and recalculates the network state 819, and provides output information to the motor means 830, thus continually repeating the computation.

The processors 840 are interconnected with an interconnection bus 841 for providing and receiving some of the concept states and expectation states. Each of the processors 840 performs computation for a subset of modules in the network 810, and has associated memory devices 842 for storing imprinted memory associated with the subset of modules. The partition of the modules among the processors 840 may be based on an adaptive balancing of computational load among functional processors. Each of the processors 840 may have a direct data bus with some of its associated memory devices 842 for faster access of frequently accessed imprinted memory.

The memory devices 842 may have a typical memory size of 1 Mbit to 100 Mbit for each module, as computed by the equation memSizeinpDim*(corDim*sparseRatio)*dimBits, where inpDim is the number of input state dimensions, corDim is the number of correlation state dimensions, sparseRatio is a sparse matrix memory compression ratio, and dimBits is the number of bits to represent a correlation weight in a dimension. The memory devices 842 may be any combination of cache memory, random access memory (RAM), read-only memory (ROM), solid-state memory, hard drives, cloud-based memory, or any other forms of non-volatile memory. The imprinted memory may be distributed across multiple devices and equipment. The memory devices 842 may receive all or part of the imprinted memory over a communication network such as an intranet or the Internet. The imprinted memory may be sparse, compressed during storage, and uncompressed during computation. The imprinted memory may be ordered or unordered, and may be organized in order of access frequency so that more frequently accessed imprinted memory is more quickly accessible such as via a fast memory cache. The imprinted memory may reside on and be transmitted across separate equipment. The imprinted memory may be distributed in non-contiguous segments of the memory devices 842.

Controlling motor means 830 using an expectation state output by network 810 is preferable to controlling a motor with a hard command because the expectation state can be updated and recalculated to allow adaptability, planning and robustness in the control of the motor means. A concept can be viewed as a goal, and the expectation state can be adapted to achieve the goal in different ways. By performing the computation of each expectation state in a module together with the computation of the corresponding concept state and refining the expectation states in a hierarchy of modules, the lower modules are given the flexibility to achieve the overarching concept based on the current situation as indicated by the input states.

In one embodiment, motor means 830 is an electric stepper motor in a robot. Instead of instructing stepper motor 830 to move a fixed number of steps, the concept state of a higher module specifies a goal, and the expectation states of lower modules induce the motor to step with as many steps as needed to achieve the goal. Each expectation state can be viewed as feedback information to lower modules regarding whether the modules are moving closer to or farther away from the goal. Over time, the robot can learn, via reinforcement learning, additional ways to achieve the goal based on newly encountered situations or newly discovered shortcuts. The concept for the goal can be invariant and thus usable by higher modules for higher planning, while the ways to achieve the goal are adapted over time. Higher modules manipulate the concept state as a knowledge token, while lower modules are guided by expectation states to operate within the constraint of the concept state. The HCE system thus enables human-like cognitive control and planning with a robustness that avoids the "brittleness" of conventional command control and pattern recognition software programs.

In another embodiment, the HCE system can be used to perform pattern recognition from video input. However, the method used by the HCE system for pattern recognition in the digital images that make up the video input does not use pattern recognition as the basis for the internal algorithms. Pattern recognition in traditional approaches outputs a label to identify an object without embedding any knowledge in the label. On the other hand, an HCE module memorizes useful predictions for and utilizations of the object by embedding this knowledge into the concept of the object. Each prediction or utilization relevant to the object is encoded as a correlation criterion associated with the concept.

For example, for the concept "apple" conventional pattern recognition includes no knowledge in the label "apple". "Apple" is then associated with predetermined patterns. If the image input matches one of the predetermined patterns, then an apple is recognized. On the other hand, the HCE system embeds expectations about "apple" together with the concept "apple" such as the texture, the shape, the taste, and the smell. A robot operating with the HCE system can mimic human-like behavior because expectation attributes are embedded into the concept "apple", so that when confronted with a situation that does not involve a predetermined pattern, such as seeing an "apple" label on a package, the robot can parse through all of the expectation attributes for contingencies relevant to the hidden content of the package.

In this embodiment, the robot uses an HCE network to evaluate images captured by a video camera and to control electric motors that move a robotic arm. The HCE network includes a manipulation module for deciding how to handle general objects. When the manipulation module receives visual dimensions captured by the camera for an object, such as a package, in combination with context and sensing feedback from the robotic arm, the module decides how to manipulate the package based on the imprinted expectation memory in the module. For example, a concept state of the module has a vector [0010001001 . . . ] representing a decision to move a package to a destination, wherein the third dimension has the value "1" corresponding to a package object, the seventh dimension has a value "1" corresponding to a destination context, and the tenth dimension has a value "1" corresponding to a movement action. The concept state [0010001001 . . . ] causes the manipulation module to generate expectation states from the input states that hierarchically compel lower modules to induce the robotic arm to move the package to the designated destination. The robotic arm is controlled using learned expectation memory stored in the module that is relevant to the package stimulus, the destination context, and the movement action as constrained by the third, seventh, and tenth concept dimensions or attributes. There may be multiple obstacles to the operation, resulting in different context dimensions. The HCE network learns a mapping in the expectation memory for the concept so that the network can induce the necessary motor movements to circumvent the obstacles in any expected context. The robotic arm is controlled differently for another different concept state, such as [0010100010 . . . ] for putting an item into the package. The robot flexibly and adaptively manipulates objects for a given concept state.

In yet another embodiment, the robot has a microphone for auditory sensing input and a loudspeaker for synthesized speech output in addition to the video camera for visual sensing input and the robotic arm with sensory feedback that is moved by a set of motors. The robot has a verbal instruction module that receives verbal instruction dimensions derived from the microphone. The verbal instruction module uses its expectation state to bias the manipulation module towards the concept [0010001001 . . . ] upon receiving from the microphone a verbal instruction "move package" or towards the concept [0010100010 . . . ] upon receiving the verbal instruction "pack object". The robot also has a speech module for communicating speech through the loudspeaker. Upon detecting a concept [0010001001 . . . ], the speech module generates expectation states to induce lower modules to produce the verbal synthesized speech "moving package to destination" in order to indicate the robot's intent.

In yet another embodiment, an autonomous vehicle uses an HCE system for self-driving or self-flying. The autonomous vehicle has cameras for object recognition of the environment as well as steering and motor mechanisms. The system learns and models objects, contexts, and optimal control actions and stored this information in the concept memory and expectation memory of the modules. For different encountered objects in the environment, together with context states of the vehicle position and moving objects, the modules determine their concept states and generate expectation states for optimal control dimensions to be provided to the steering and motor mechanisms. For example, a module generates an expectation state that induces a braking action when the module receives an input state representing a pedestrian in a context of crossing the street in front of the vehicle. This expectation state is generated according to a computation based on the expectation memory that was previously learned from actual human drivers. The expectation state thus compels the braking control mechanism to reach a state that matches the imprinted binding between the braking action and the stimulus and context state of a pedestrian crossing the street. Multiple modules can monitor multiple situations in their concept states, such as multiple objects in multiple contexts. The modules compute expectation states for these situations that together map to the optimal control of the vehicle.

In yet another embodiment, a medical expert system includes a diagnostic module that evaluates medical test information dimensions, including from digital images. The diagnostic module determines a diagnostic result in its concept state using its concept memory and then computes an expectation state with its expectation memory that guides lower modules to produce and transmit recommendations to a medical staff through a loudspeaker or visual display equipment.

Figure 9:
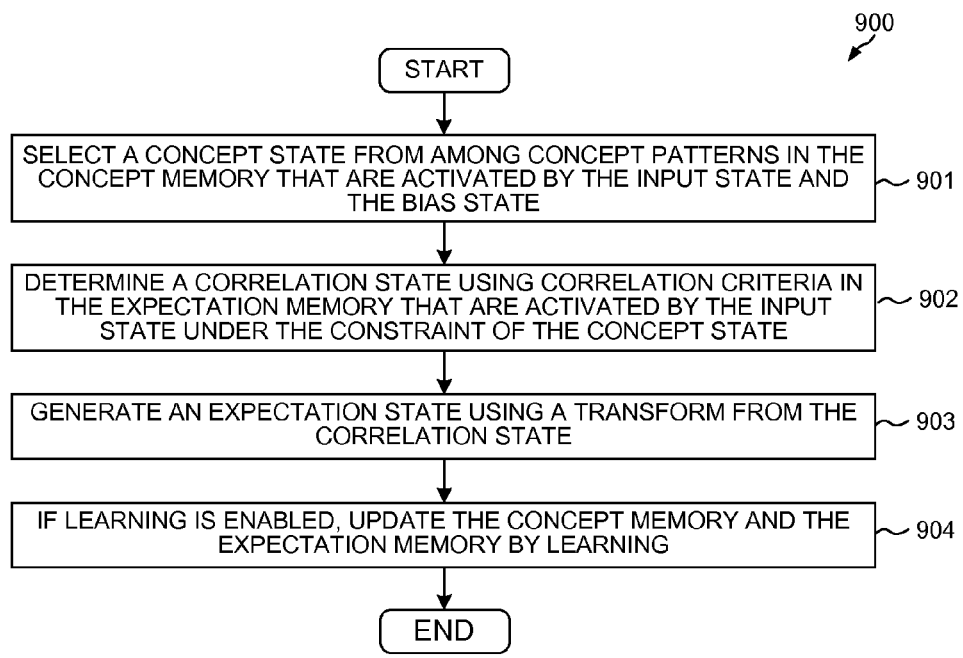
FIG. 9 is a flow diagram of a computational method in a module in an HCE system.

FIG. 9 is a flow diagram of a computational method 900 in a module in a HCE system. The module has an input state, an expectation state, a concept state, a bias state, and a correlation state in vector or similar representations. The module has a concept memory, an expectation memory, a concept re-dimensioning transform, and an expectation re-dimensioning transform in matrix or similar representations.

In step 901, the concept state is selected from among concept patterns in the concept memory that are activated by the input and bias states. In step 902, a correlation state is determined using correlation criteria in the expectation memory that are activated by the input state under the constraint of the concept state. In step 903, an expectation state is generated using a transform from the correlation state. In step 904, the concept memory and the expectation memory are updated by learning if learning is enabled.

In a matrix formulation, the concept state (conState) is computed as a linear combination of first matrix multiplication with a second matrix combination. The first matrix multiplication is between the imprinted concept memory matrix (ConMem) and the combined vector of the bias state (biaState) and concept state (conState). The second matrix multiplication is between the concept re-dimensioning transform matrix (ConRedim) and the input state (inpState). The concept memory has recurrent mappings among the dimensions of the concept state for auto-associative recurrent attractor imprinting. The constrained expectation mapping is first computed as a correlation state (corState) with matrix multiplication between the imprinted expectation memory matrix (ExpMem) and the input state, with its result constrained by the concept state. The correlation state computation may have an optional recurrent matrix multiplication with an optional recurrent matrix for the correlation state. The expectation state (expState) is dimensionally reduced from the correlation state (corState) through the expectation re-dimensioning transform matrix (ExpRedim). In one embodiment, the steps 901, 902, and 903 correspond to the following computational pseudo-code (in MATLAB style), in which act( ) is an activation function with a sparseness and constrain( ) is a constraining function:

conState=act(ConMem*[biaState;conState]+
 ConRedim*inpState);

corState=constrain(act(ExpMem*inpState),conState);

and expState=act(ExpRedim*corState).

In some embodiments, the constraining function constrain( ) disinhibits a predefined subset of dimensions in the correlation state corresponding to each activated dimension in the concept state, thus significantly reducing the scale of computation to only a subset of the expectation memory corresponding to the disinhibited subset. ExpRedim and ConRedim can range from learned or optimized autocorrelation matrices to random projection matrices as long as they preserve the distance among the states. ExpRedim and ConRedim can be the shared among different modules as intrinsic matrices or generated online based on predefined rules so that they minimize storage memory. In one embodiment, only ConMem and ExpMem are learned, while ConRedim and ExpRedim are intrinsic random projections that do not require learning.

The imprinted memory can use a multiplicity of learning methods, including types of learning that emulate the Hebbian learning rule in the neurons in the brain: "what fire together, wire together". If learning is enabled, the module updates the concept memory according to the correlation between the above-average activated dimensions of the concept state and the activated dimensions of the bias state and concept state. The module also updates the expectation memory according to the correlation between the above-average activated dimensions of the correlation state and the activated dimensions of the input state. In one embodiment, the step 904 corresponds to the following computational pseudo-code (in MATLAB style), in which rate1, rate2, rate3, and rate4 are learning rates:

ConMem=ConMem+rate1*(conState−conAvg)*[bia-
 State;conState]';

conAvg=conAvg+rate2*(conState−conAvg);

ExpMem=ExpMem+rate3*constrain(corState−
 corAvg,conState)*inpState';

and corAvg=corAvg+rate4*constrain(corState−corAvg,
 conState).

In other embodiments, the learning mechanism includes using neural networks, such as deep learning networks, for pattern recognition that generate the equivalence of the concept patterns and correlation criteria. In other embodiments, a non-linear dimensionality reduction algorithm is used to map the concept dimensions. Alternate embodiments use other self-organization algorithms for the imprinted memory, such as the k-means or the principal component analysis methods. Whichever learning algorithms are employed for a module, the learning results are stored as a concept memory for concept state computation and an expectation memory for expectation state computation.

Figure 10:
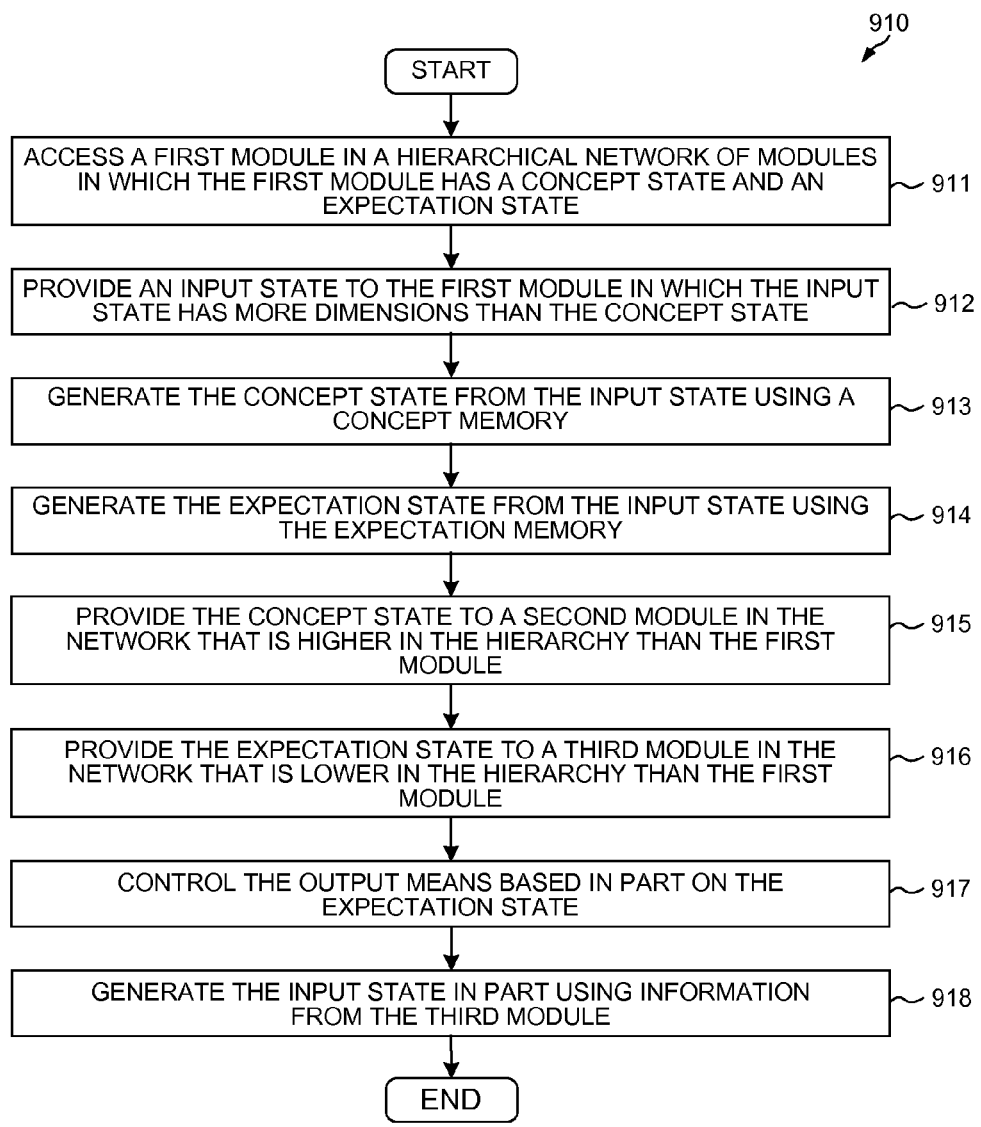
FIG. 10 is a flow diagram of a method of computation in an HCE system.

FIG. 10 is a flow diagram of a method 910 of computation in a HCE hardware or software system. In step 911, a first module is accessed in a network of modules that has a hierarchy. The network is coupled to an output means. The first module is associated with a concept memory and an expectation memory and has a concept state and an expectation state. The concept state has dimensions and a correlation among its dimensions. In step 912, an input state is provided to the first module, wherein the input state has more dimensions than the concept state. In step 913, the concept state is generated computed from the input state using the concept memory. The concept state is invariant for a range of input state variation.

In step 914, the expectation state is generated from the input state using the expectation memory. The expectation state is generated based on correlations among the dimensions of the input state and is modulated by the concept state. The expectation state varies for the range of input state variation. In step 915, the concept state is provided to a second module in the network that is higher in the hierarchy than the first module. In step 916, the expectation state is provided to a third module in the network that is lower in the hierarchy than the first module. In step 917, the output means is controlled based in part on the expectation state. In step 918, the input state is generated in part using information from the third module.

Because cognitive representation is based on imprinted memory, a body of cognitive representations can be isomorphically mapped from one cognitive hierarchy to another so long as the imprinted memory for concepts and expectations is isomorphically preserved. For example, each concept and expectation state can be combined with a module identification label into a grounded symbol and sent over a communication infrastructure to a remote computation infrastructure (such as an internet cloud) to obtain a result for computation, thus treating the communication and remote computation infrastructures as media for symbolic computation that is isomorphic to a part of the hierarchical conceptualized expectation network. The body of cognitive representations can grow organically through learning by incrementally adding new concepts constraining existing expectations, or by adding new expectations mapping existing concepts.

In the preferred embodiments, concept states and expectation states are received and projected as multidimensional vectors, sets of attributes, or signals. In other embodiments, concept states and expectation states are encoded, transmitted, and processed as symbols referencing a concept library. The meanings of the concept states and expectation states are grounded in the concept library. Symbols from the concept library are then converted into concept states and expectation states at the processing equipment. The concept states and expectation states are used as inputs to an HCE network and used to learn higher concepts in the imprinted memory of the processing equipment so long as the concept library can ensure consistency and proper linkage among the symbols provided. In other embodiments, the symbols in the concept library are semantic symbols in a standardized semantic library. In other embodiments, the symbols in the concept library are natural language symbols in a natural language such as English.

Modules are used for computation in the various embodiments. In a description in which a module performs or is associated with an action such as receiving, projecting, providing, maintaining, selecting, constraining, deciding, determining, comparing, selecting, associating, computing, performing, mapping or another action, it is to be understood that the actual action may be performed by any processor or computing means using the imprinted memory and network connections associated with the module. It is to be understood that any method by or for the module also refers to an equivalent method by any computational means that generates equivalent results for the module. Modules can have different memory sizes and can utilize different informational formats in different regions of the network.

A state as referred to herein can be of any format and have any number of attribute dimensions. A state can be equivalently interconverted between formats and dimensional sizes among modules, such as through random projections or other transforms. A state may be multivariate or univariate, with each variable quantity distributed among the attribute dimensions. A state may be compressed or expanded based on its sparseness. A state may have Boolean (digital) or continuous (analog) values in each attribute dimension. A state may comprise a rate code distributed among multiple dimensions. A state may be encoded as or transformed to a symbol from a list of symbols. A state may be communicated as a signal, a code, a symbol, list of key-value pairs, a set of voltages, a set of currents, or an electromagnetic stream.

An expectation mapping may be any mapping condition that reduces the degrees of freedom of an input state. An expectation mapping may use a mathematical operation, a production rule, a neural emulation, a logical rule, a fuzzy logic rule, a conditional rule, a semantic rule, an instruction, or a mapping.

The systems and methods described herein may be implemented in other embodiments that are equivalently mapped from the above-described embodiments. In other embodiments, a symbolic network may be implemented in which each module is a memory structure, and each concept pattern in the module is a symbol associated with the memory structure, and each imprinted expectation mapping is a rule among symbols. Other embodiments may be implemented in which each module is mapped into an ensemble of neural computational units. The concept memory is encoded by the synaptic weights in a deep layer in the neural columns, and the expectation memory is encoded by the synaptic weights in a superficial layer in the neural columns.

In the preferred embodiments, cognitive computation and imprinted memory learning occur in parallel, each at a duty factor determined by the desired application. In other embodiments, learning can occur at a slower rate than cognitive computation in order to prioritize computational and memory resource for cognitive computation. In other embodiments, computation is implemented separately from learning, including using separate processors and equipment. In other embodiments, the described methods and systems implement only computation using previously imprinted memory. In other embodiments, learning is implemented to generate imprinted memory in a library for use by another system.

In the preferred embodiment, the disclosed system uses processors to execute software to implement the described method. The processors may be distributed across a communication network such as an intranet or the Internet. In other embodiments, the disclosed system uses neuromorphic integrated circuits or other types of manufactured circuitry to implement the described method. In other embodiments, the method is implemented in devices that also store the imprinted memory, such as in a neuromorphic system. In other embodiments, the method may be implemented by a cloud-based system in the Internet or intranet. Other embodiments may combine these into a hybrid of above-mentioned embodiments.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present disclosure.

Where one or more exemplary embodiments are implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. Concept memory 305 and expectation memory 306 are examples of such a computer-readable medium. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Although certain specific embodiments are described above for instructional purposes, the teachings of this patent document have general applicability and are not limited to the specific embodiments described above. Although the HCE network is described above as receiving sensory input directly into the HCE network, in other embodiments the HCE network is remote from the sensing and output means. For example, the input and output means are the microphone and speaker on a cell phone. The input data is transmitted over a communication network to the remote HCE network, and the expectation state information is transmitted back over the communication network to the cell phone. The remote HCE network uses its learned knowledge to provide responses to general inquiries from cell phone users. Accordingly, various modifications, adaptations, and combinations of various features of the described embodiments can be practiced without departing from the scope of the invention as set forth in the claims.

What is claimed is:

1. A system comprising:
a first module of a hierarchical network, wherein the first module includes a first array of bits and a second array of bits, wherein a first value stored in the first array of bits represents a concept state, and a second value stored in the second array of bits represents an expectation state, and wherein the first module receives a third value that represents an input state;
a second module of the hierarchical network that has a higher hierarchy than the first module, wherein the second module receives the first value from the first module;
a third module of the hierarchical network that has a lower hierarchy than the first module, wherein the third module receives the second value from the first module, and wherein the first module derives the third value depending at least in part from the third module;
a concept memory that contains concept information, wherein the first value is computed using the third value and the concept information;
an expectation memory that contains expectation information, wherein the second value is computed using the first value, the third value and the expectation information; and
an actuated mechanism that receives a signal derived from the second value, wherein an operation of the actuated mechanism is influenced by the signal.

2. The system of claim 1, wherein the first array of bits and the second array of bits are formed by registers.

3. The system of claim 1, wherein the actuated mechanism is an electric motor, and wherein the operation is movement of the motor rotor.

4. The system of claim 1, wherein the actuated mechanism is a loudspeaker.

5. The system of claim 1, wherein the actuated mechanism is a display on which pixels are actuated, and wherein the operation is generating an image.

6. The system of claim 1, wherein the third value is represented by more bits than is the first value.

7. The system of claim 1, wherein the second value is a multidimensional vector comprised of discrete numbers.

8. The system of claim 1, wherein the computed first value remains unchanged despite being computed using various third values that fall within a range.

9. The system of claim 1, wherein the computed second value varies upon being computed using various third values.

10. The system of claim 1, wherein the first array of bits represents at least 10 dimensions.

11. The system of claim 10, wherein the concept memory comprises a matrix that correlates the dimensions of the first array of bits to each other.

12. The system of claim 1, wherein the third value is stored in a third array of bits, and wherein the expectation memory comprises matrices that map dimensions of the third array of bits to dimensions of the second array of bits.

13. The system of claim 1, wherein the expectation information is updated as the second value is iteratively computed.

14. The system of claim 1, further comprising:
a digital image sensor that generates a fourth value stored in a fourth array of bits, wherein the third value is computed based in part on the fourth value.

15. A method comprising:
computing a first value using concept information stored in a concept memory;
computing a second value using expectation information stored in an expectation memory;
transmitting the first value from a first module to a second module, wherein the first module, the second module and a third module are parts of a hierarchical network, wherein the second module has a higher hierarchy than the first module, wherein the first module includes a first array of bits and a second array of bits, and wherein the first value is stored in the first array of bits and represents a concept state;
transmitting the second value from the first module to a third module, wherein the third module has a lower hierarchy than the first module, wherein the second value is stored in the second array of bits and represents an expectation state;
receiving a third value onto the first module, wherein the third value is derived depending at least in part from the third module and represents an input state, wherein the third value is also used to compute the first value, and wherein the third value and the first value are also used to compute the second value;
transmitting a signal to an actuated mechanism, wherein the signal is derived from the second value; and
controlling an operation of the actuated mechanism based on the signal.

16. The method of claim 15, wherein the first array of bits and the second array of bits are formed by registers.

17. The method of claim 15, wherein the actuated mechanism is an electric motor.

18. The method of claim 15, wherein the third value is represented by more bits than is the first value.

19. The method of claim 15, wherein the computed first value remains unchanged despite being computed using various third values that fall within a range.

20. The method of claim 15, wherein the computed second value varies upon being computed using various third values.

21. The method of claim 15, wherein the first array of bits is organized in multiple dimensions, and wherein the concept memory correlates the dimensions of the first array of bits to each other.

22. The method of claim 15, further comprising:
updating the expectation information as the second value is iteratively computed.

23. The method of claim 15, further comprising:
generating a fourth value using a digital image sensor; and
computing the third value based in part on the fourth value.

24. A method comprising:
receiving a first value onto a first module from a third module, wherein the first module, a second module and the third module are parts of a hierarchical network, wherein the second module has a higher hierarchy than the first module, and the third module has a lower hierarchy than the first module, wherein the first module includes a first array of bits and a second array of bits, and wherein the first value is stored in the first array of bits and represents a concept state;
recalculating the first value using concept information stored in a concept memory;
transmitting the recalculated first value from the first module to the second module;
recalculating a second value using expectation information stored in an expectation memory, wherein the second value is stored in the second array of bits and represents an expectation state;
transmitting the recalculated second value from the first module to the third module;
receiving a third value onto the first module, wherein the third value is derived depending at least in part from the third module and represents an input state, wherein the third value is also used to recalculate the first value, and wherein the third value and the first value are also used to recalculate the second value;
transmitting to an actuated mechanism a signal derived from the recalculated second value; and
controlling an operation of the actuated mechanism based on the signal.

25. The method of claim 24, wherein the first array of bits and the second array of bits are formed by registers.

26. The method of claim 24, wherein the actuated mechanism is a loudspeaker, and wherein the operation is vibrating a diaphragm of the loudspeaker.

27. The method of claim 24, wherein the recalculated first value remains unchanged despite being recalculated using various third values that fall within a range.

* * * * *